United States Patent
Chiu et al.

(10) Patent No.: US 12,443,274 B2
(45) Date of Patent: Oct. 14, 2025

(54) METHODS AND SYSTEMS FOR CHANGING A DISPLAY BASED ON USER INPUT AND GAZE

(71) Applicant: Apple Inc., Cupertino, CA (US)

(72) Inventors: Shih-Sang Chiu, San Francisco, CA (US); Benjamin H. Boesel, Sunnyvale, CA (US); David H. Huang, San Mateo, CA (US); Jonathan Perron, Felton, CA (US); Jonathan Ravasz, Sunnyvale, CA (US); Jordan A. Cazamias, San Francisco, CA (US); Tyson Erze, Felton, CA (US)

(73) Assignee: APPLE INC., Cupertino, CA (US)

( * ) Notice: Subject to any disclaimer, the term of this patent is extended or adjusted under 35 U.S.C. 154(b) by 0 days.

(21) Appl. No.: 18/575,046

(22) PCT Filed: Jun. 14, 2022

(86) PCT No.: PCT/US2022/033399
§ 371 (c)(1),
(2) Date: Dec. 28, 2023

(87) PCT Pub. No.: WO2023/278138
PCT Pub. Date: Jan. 5, 2023

(65) Prior Publication Data
US 2024/0310907 A1  Sep. 19, 2024

Related U.S. Application Data

(60) Provisional application No. 63/215,872, filed on Jun. 28, 2021.

(51) Int. Cl.
*G06F 3/01* (2006.01)
*G06F 3/04842* (2022.01)

(52) U.S. Cl.
CPC .............. *G06F 3/013* (2013.01); *G06F 3/017* (2013.01); *G06F 3/04842* (2013.01)

(58) Field of Classification Search
None
See application file for complete search history.

(56) References Cited

U.S. PATENT DOCUMENTS

| 2008/0120358 A1 | 5/2008 | Yano et al. |
| 2014/0176554 A1 | 6/2014 | Cohen et al. |

(Continued)

FOREIGN PATENT DOCUMENTS

| WO | 2020100422 A1 | 5/2020 |

OTHER PUBLICATIONS

PCT International Search Report and Written Opinion dated Sep. 29, 2022, PCT International Application No. PCT/US2022/033399, pp. 1-12.

*Primary Examiner* — Duane N Taylor, Jr.
(74) *Attorney, Agent, or Firm* — Fernando & Partners, LLP

(57) ABSTRACT

In one implementation, a method of activating a user interface element is performed at a device including an input device, an eye tracker, a display, one or more processors, and non-transitory memory. The method includes displaying, on the display, a plurality of user interface elements and receiving, via the input device, a user input corresponding to an input location. The method includes determining, using the eye tracker, a gaze location. The method includes, in response to determining that the input location is at least a threshold distance from the gaze location, activating a first user interface element at the gaze location and, in response to determining that it is not, activating a second user interface element at the input location.

20 Claims, 26 Drawing Sheets

(56) References Cited

U.S. PATENT DOCUMENTS

| | | |
|---|---|---|
| 2018/0040026 A1 | 2/2018 | Forsblom |
| 2020/0201444 A1 | 6/2020 | Stoyles et al. |
| 2021/0389595 A1 | 12/2021 | Yasuda et al. |
| 2023/0007085 A1* | 1/2023 | Berliner ................ G06F 3/0482 |

* cited by examiner

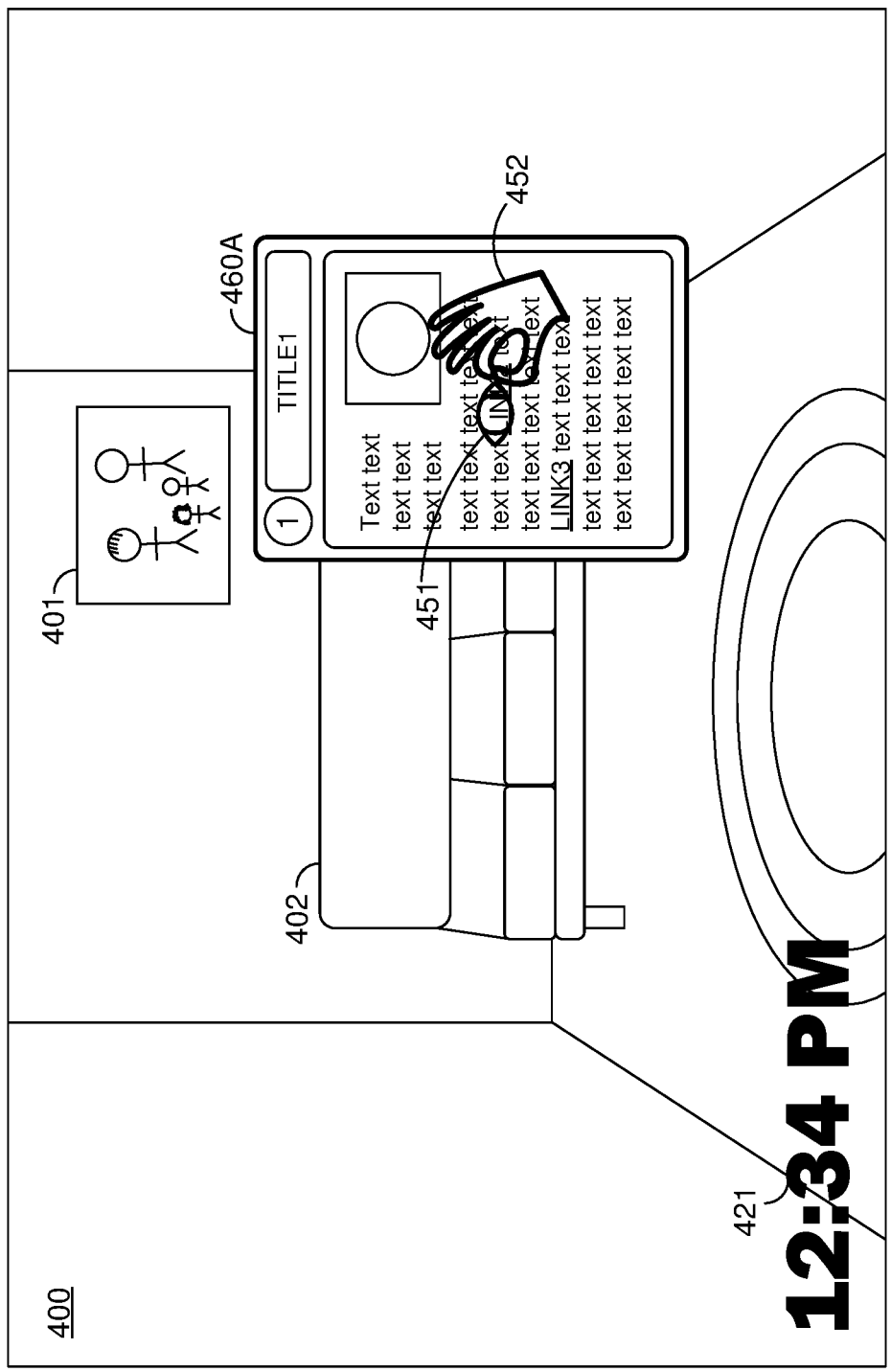
Figure 4B1

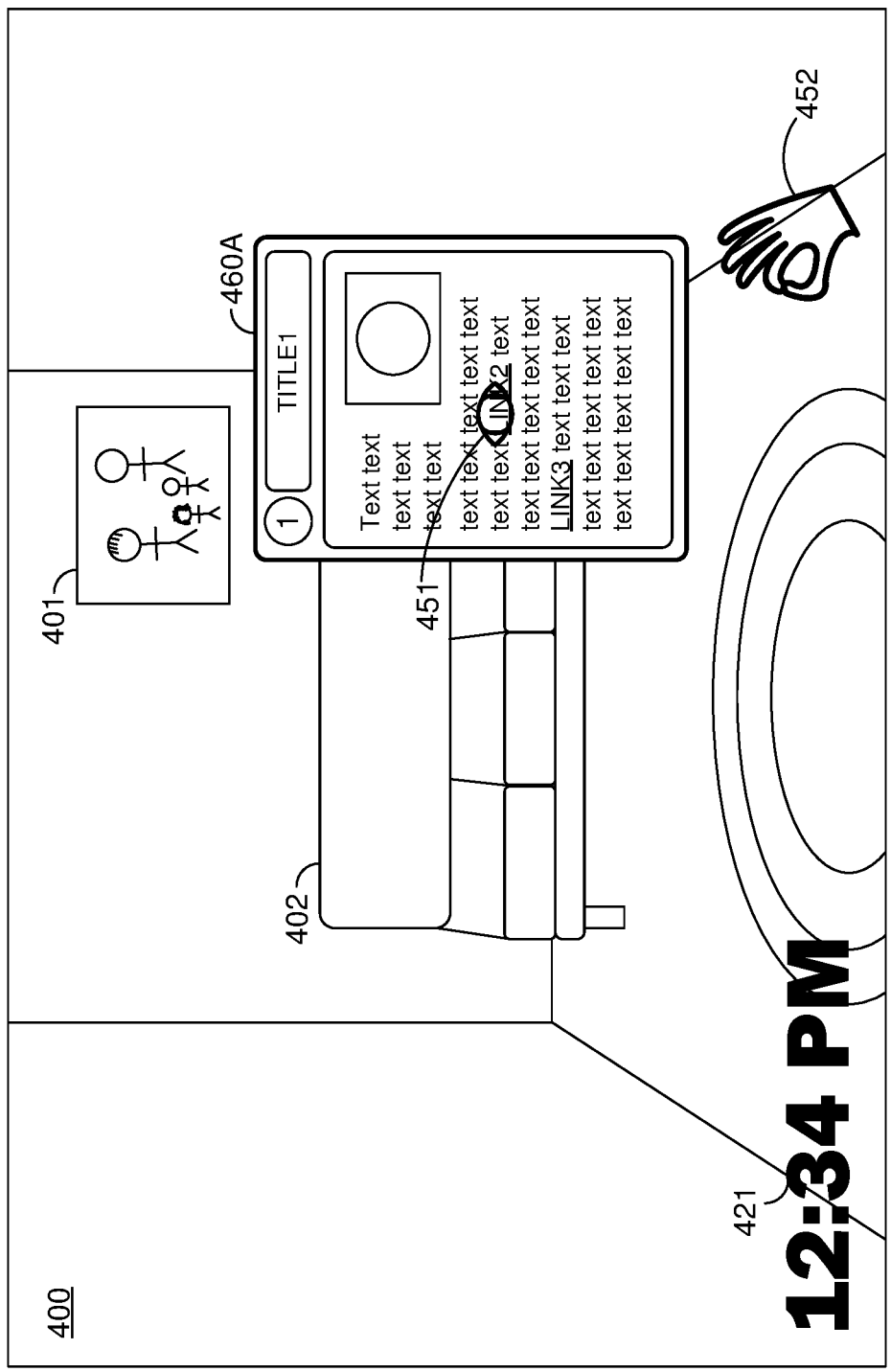
Figure 4B2

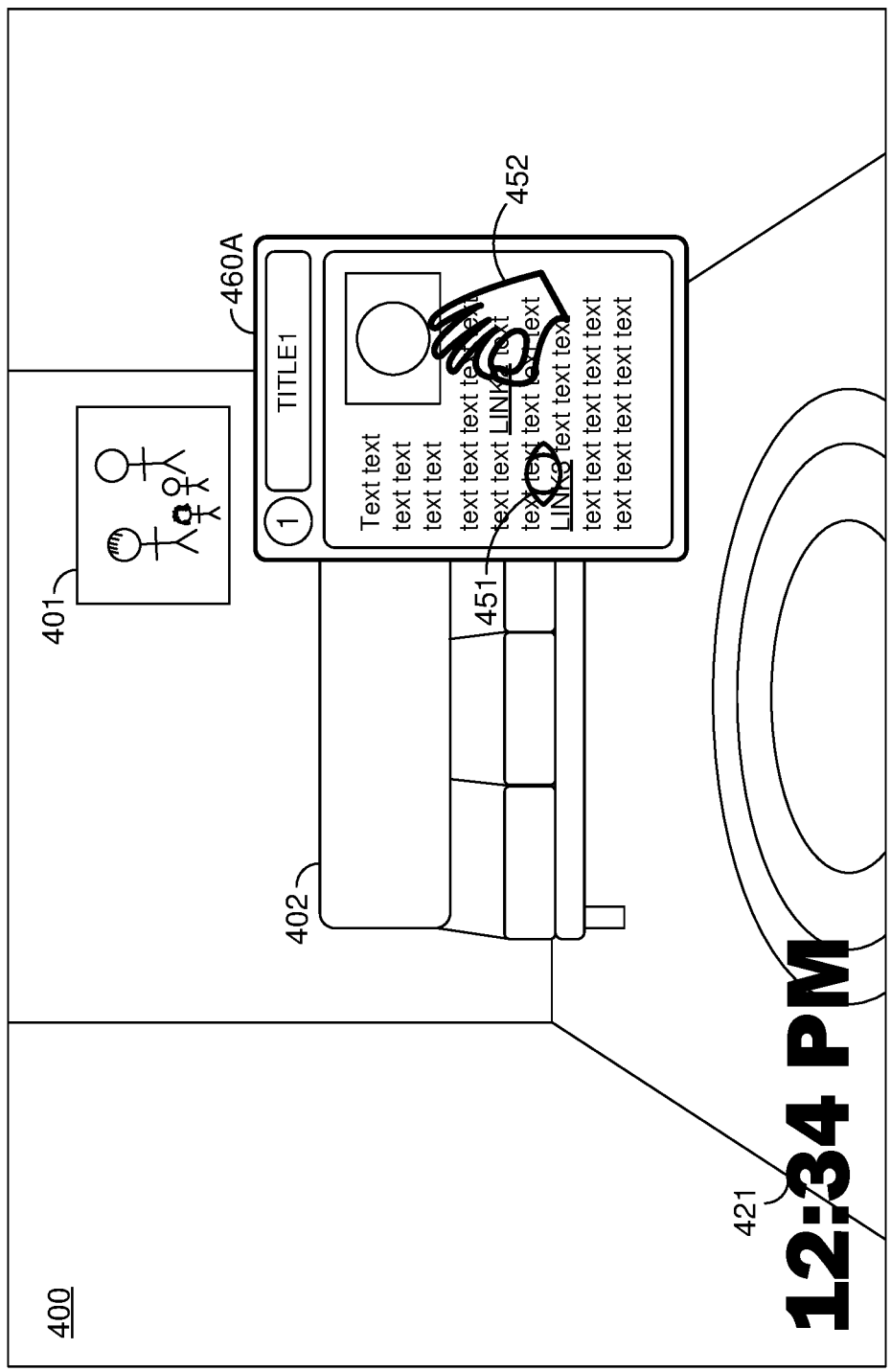
Figure 4B3

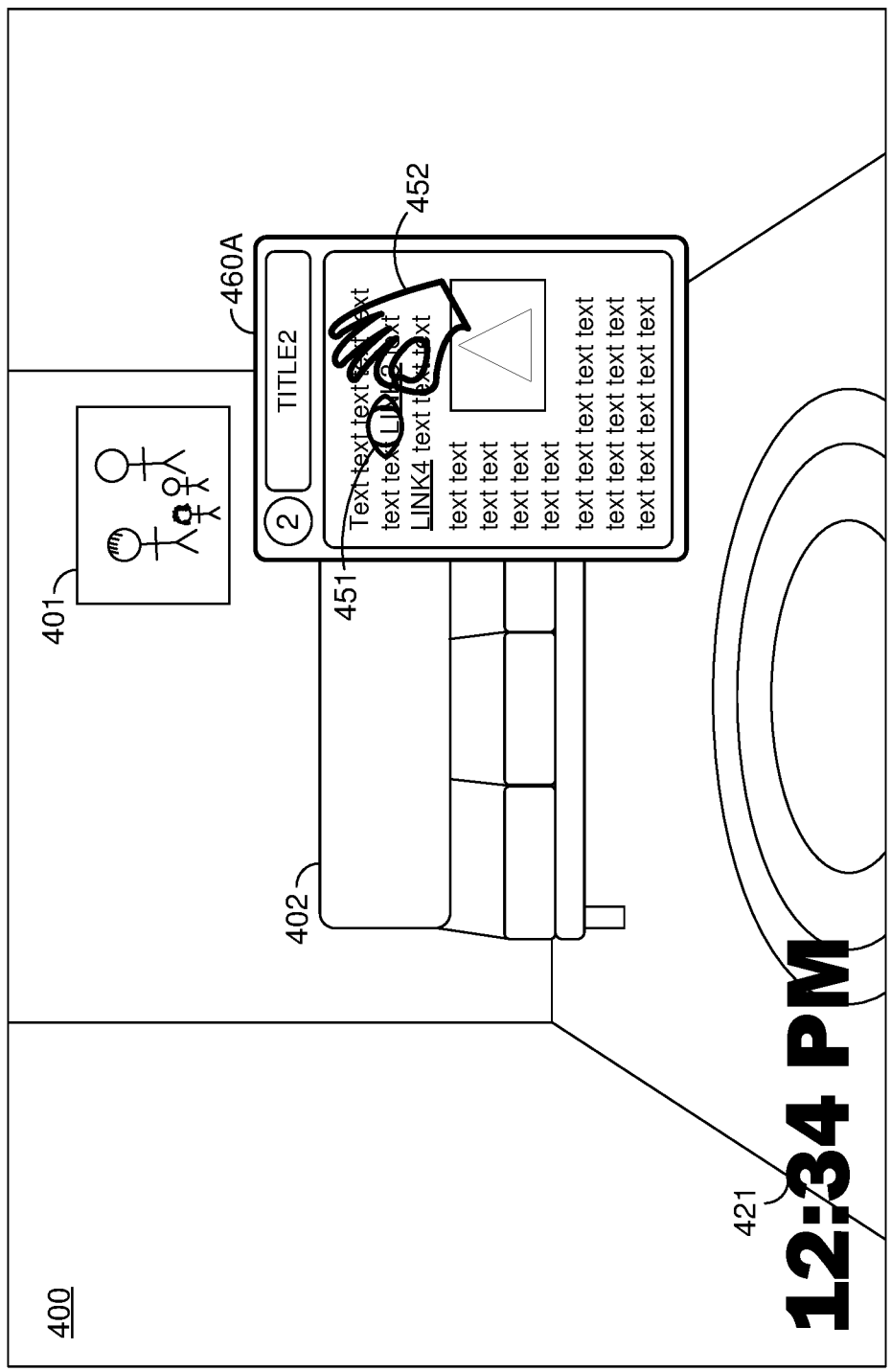
Figure 4D1

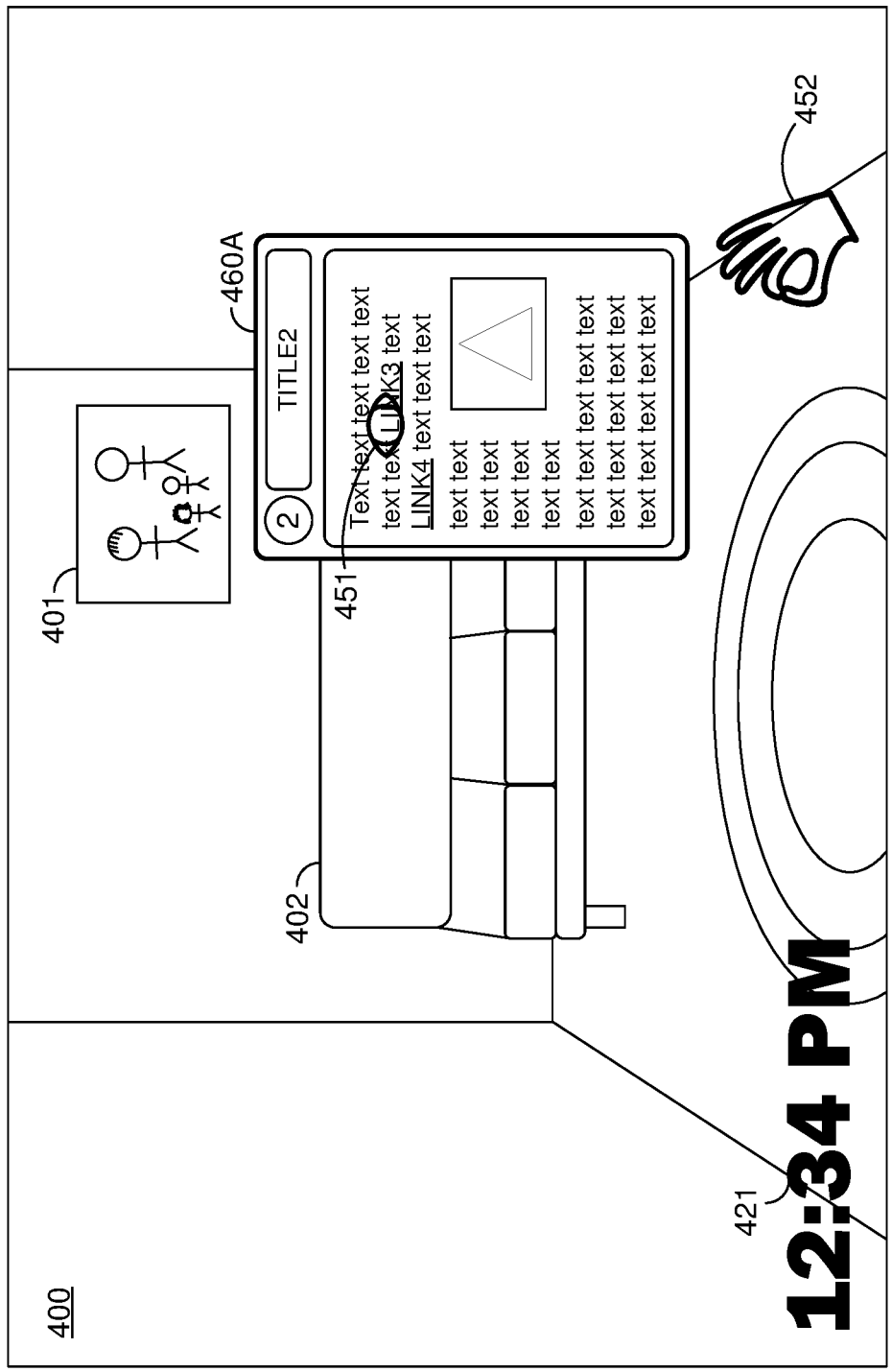
Figure 4D2

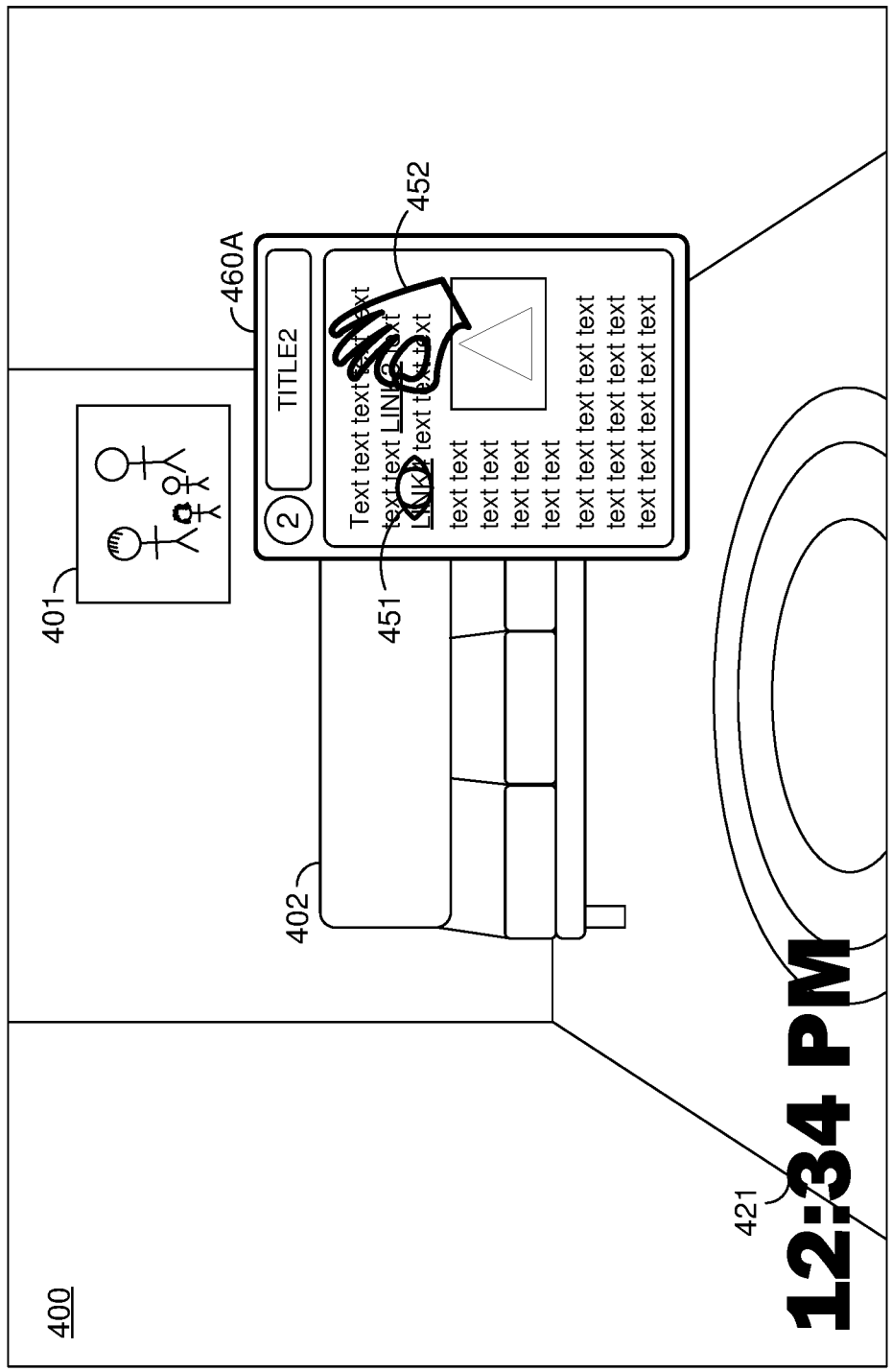
Figure 4D3

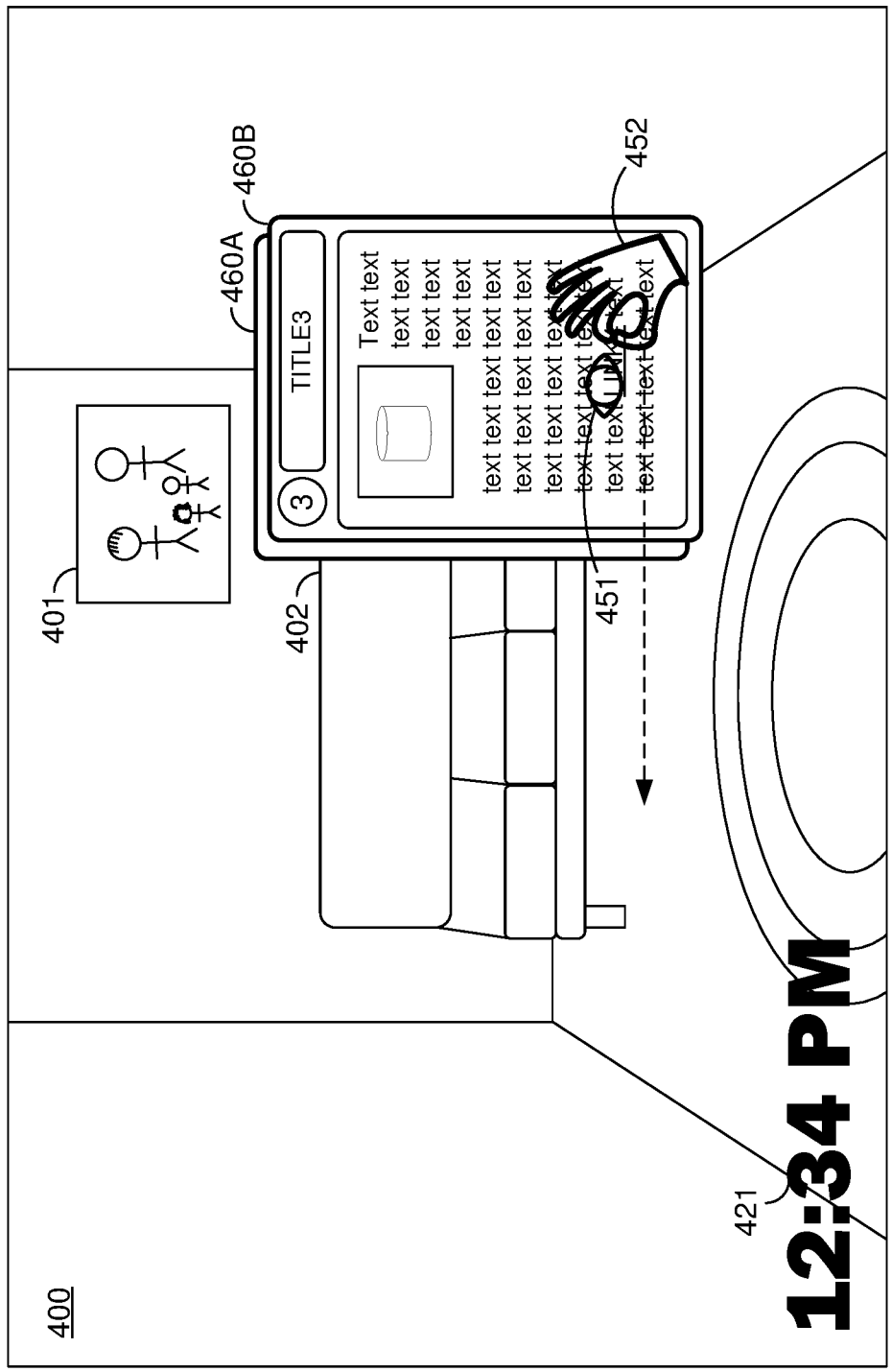
Figure 4F1

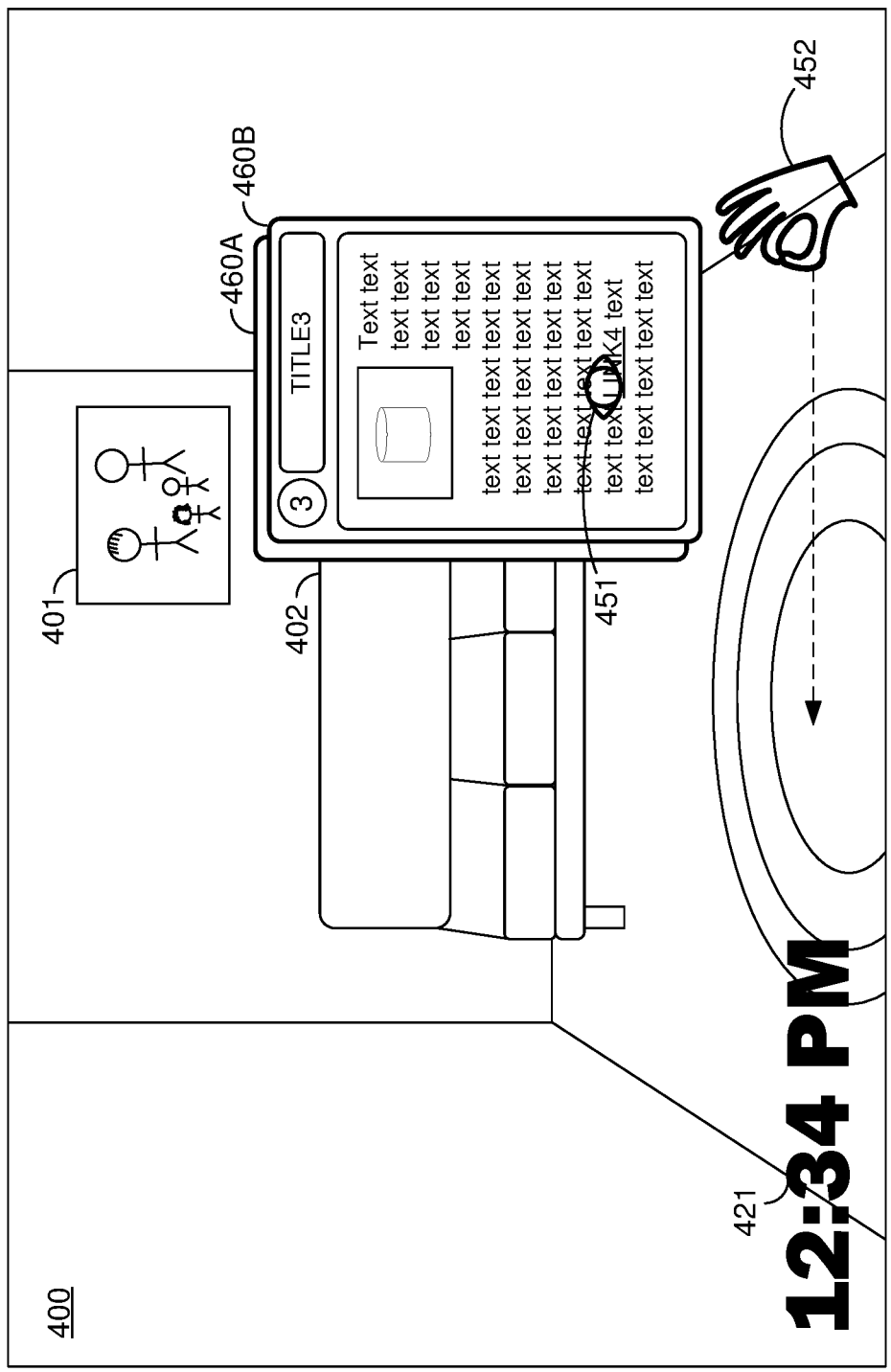
Figure 4F2

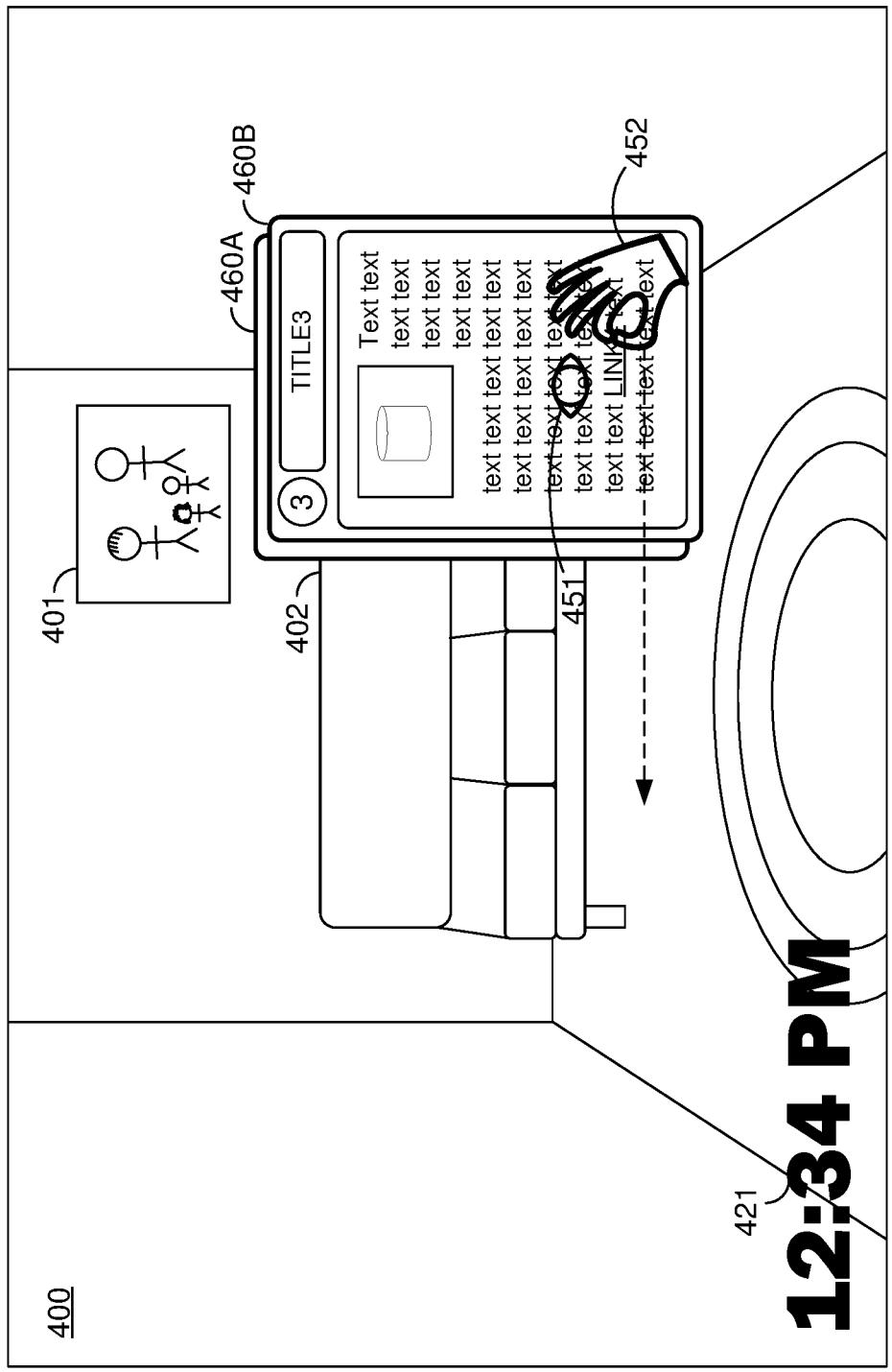
Figure 4F3

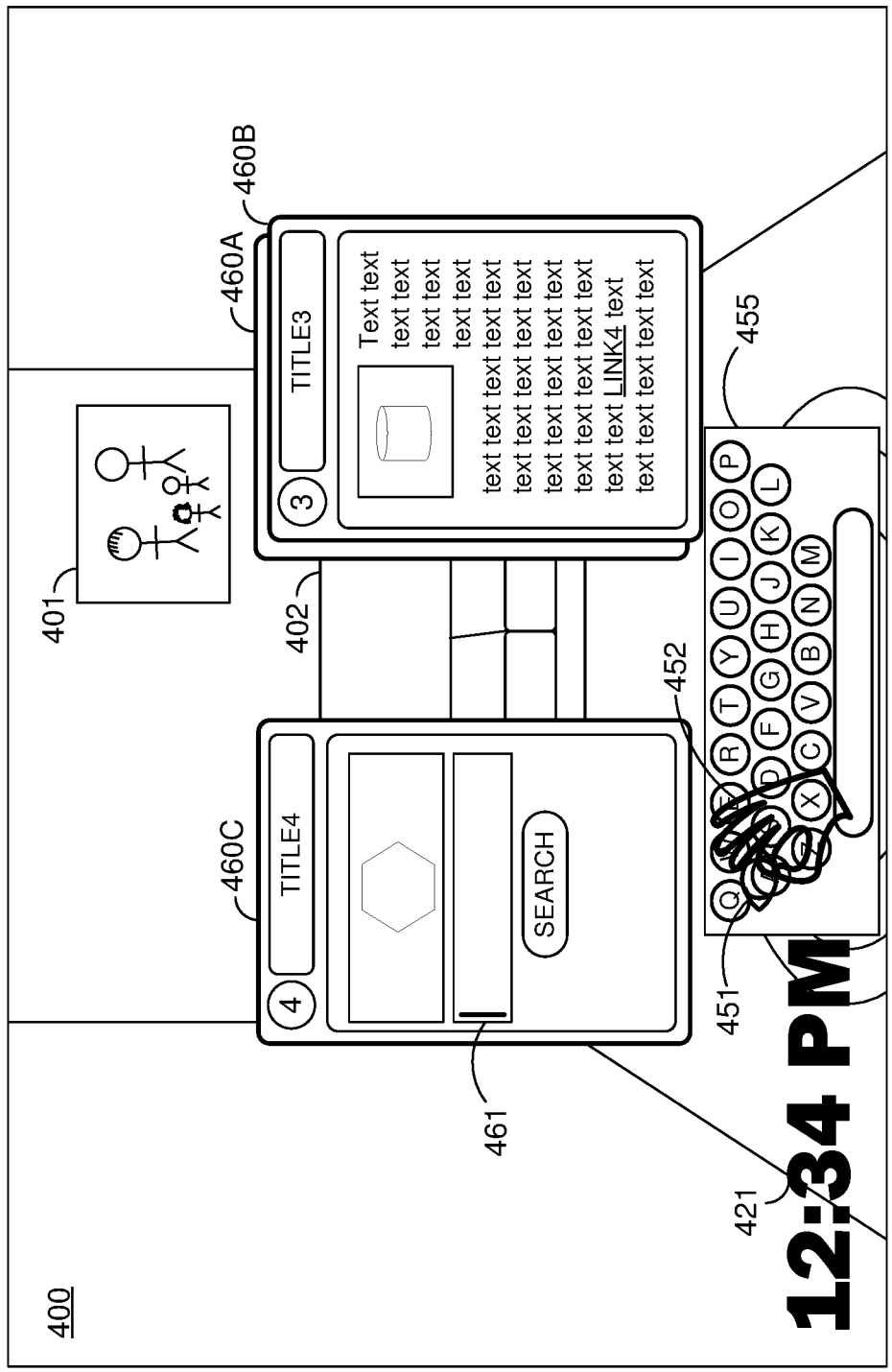
Figure 4H1

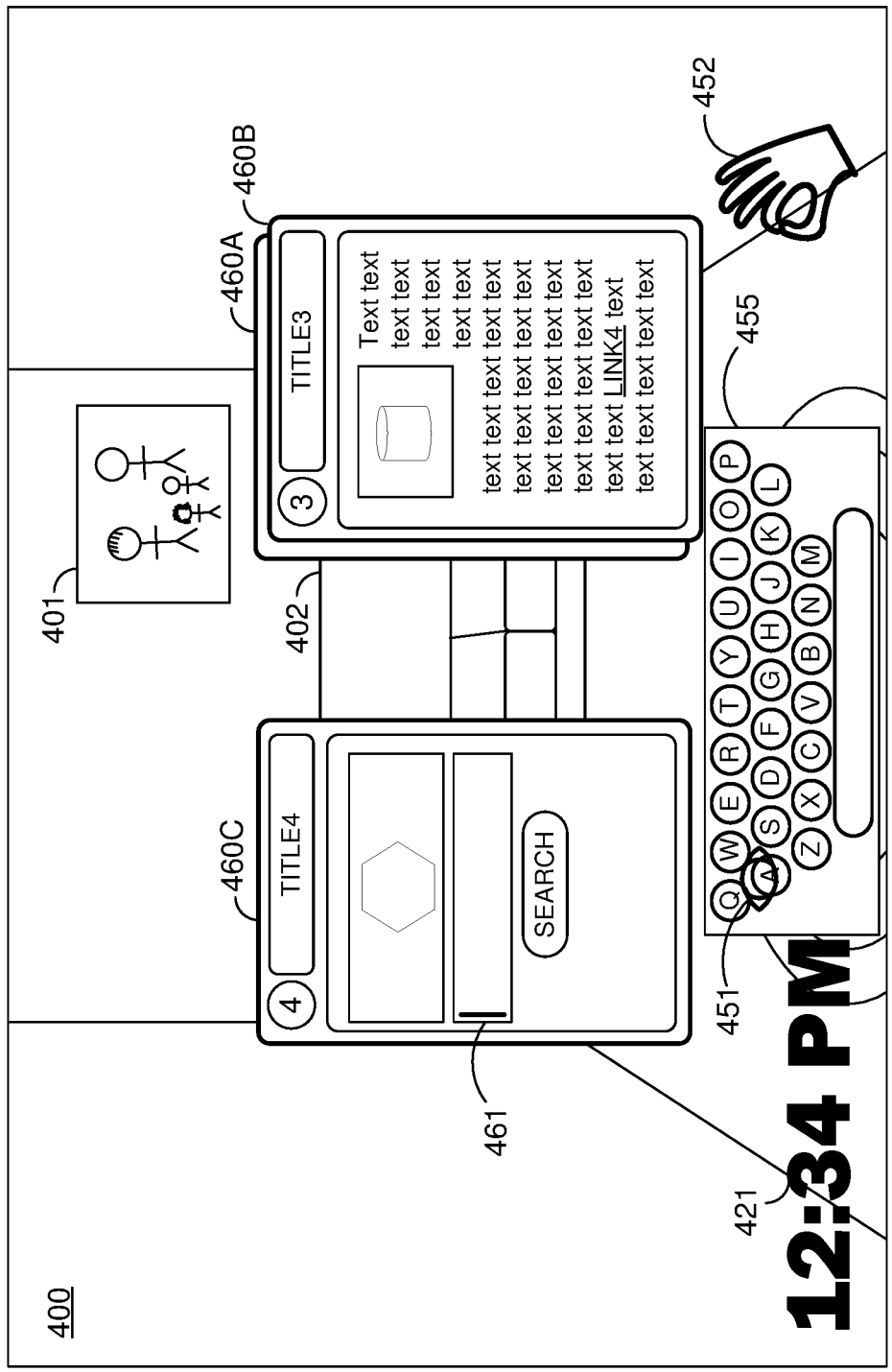
Figure 4H2

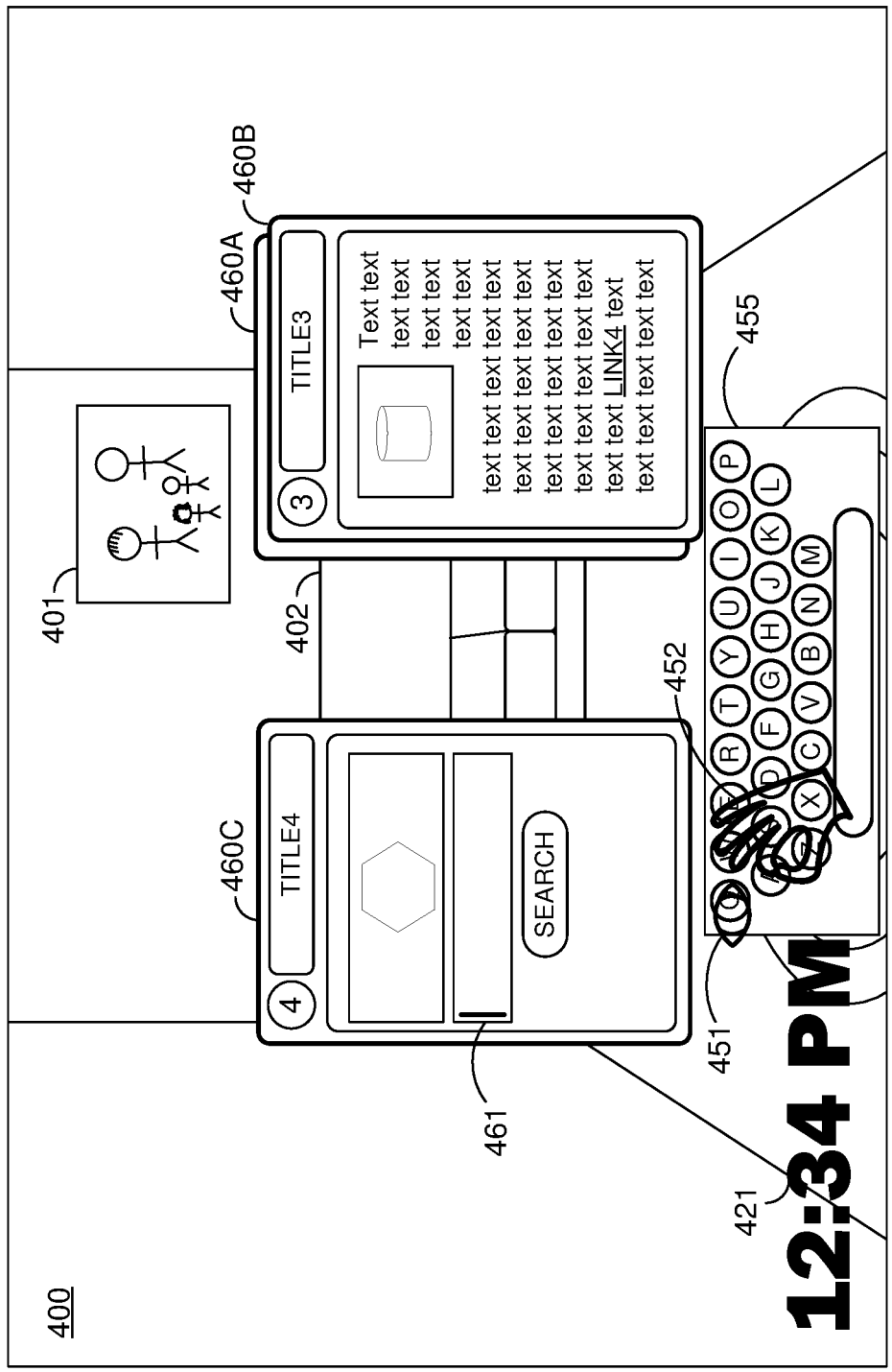
Figure 4H3

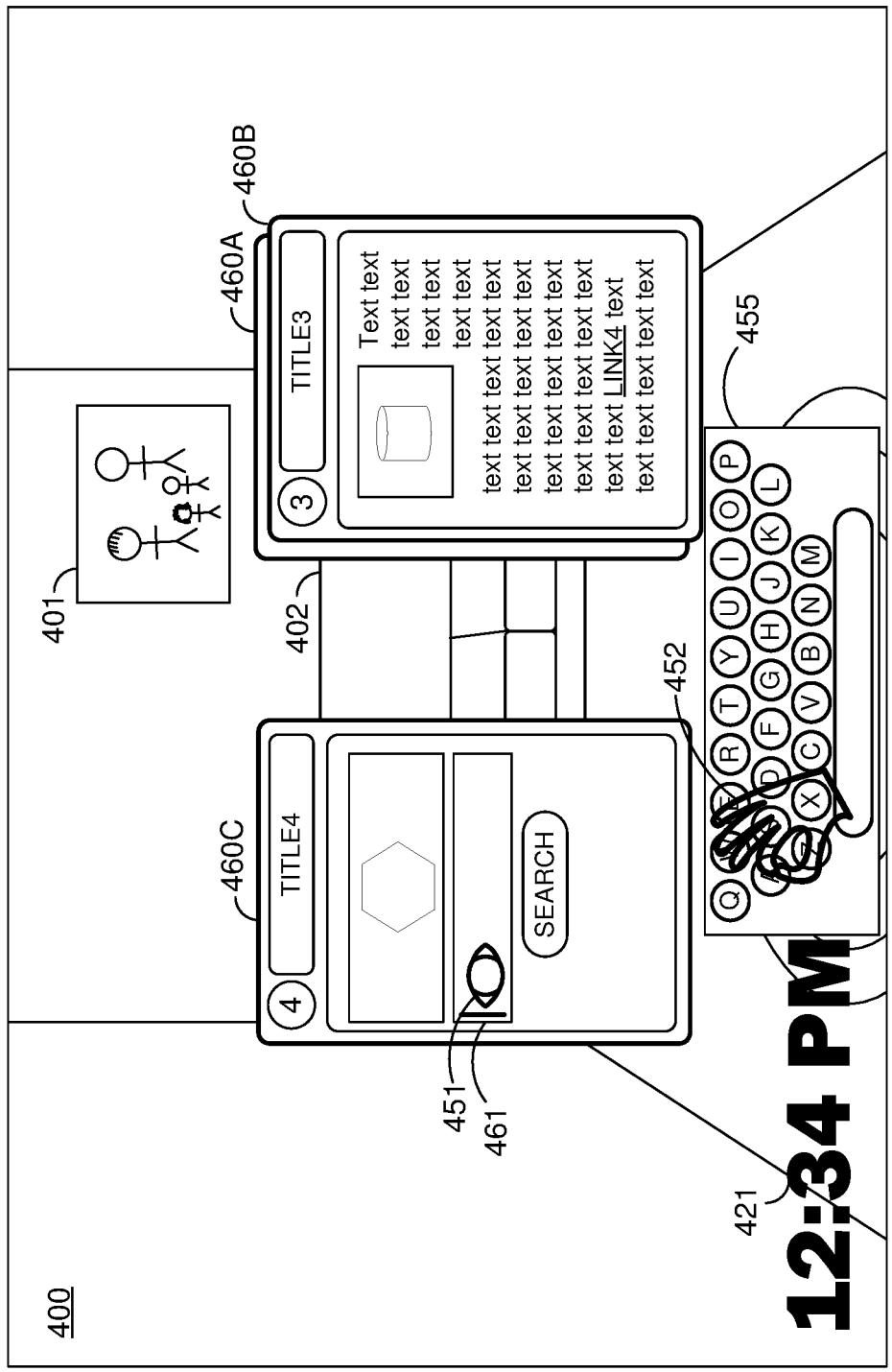
Figure 4H4

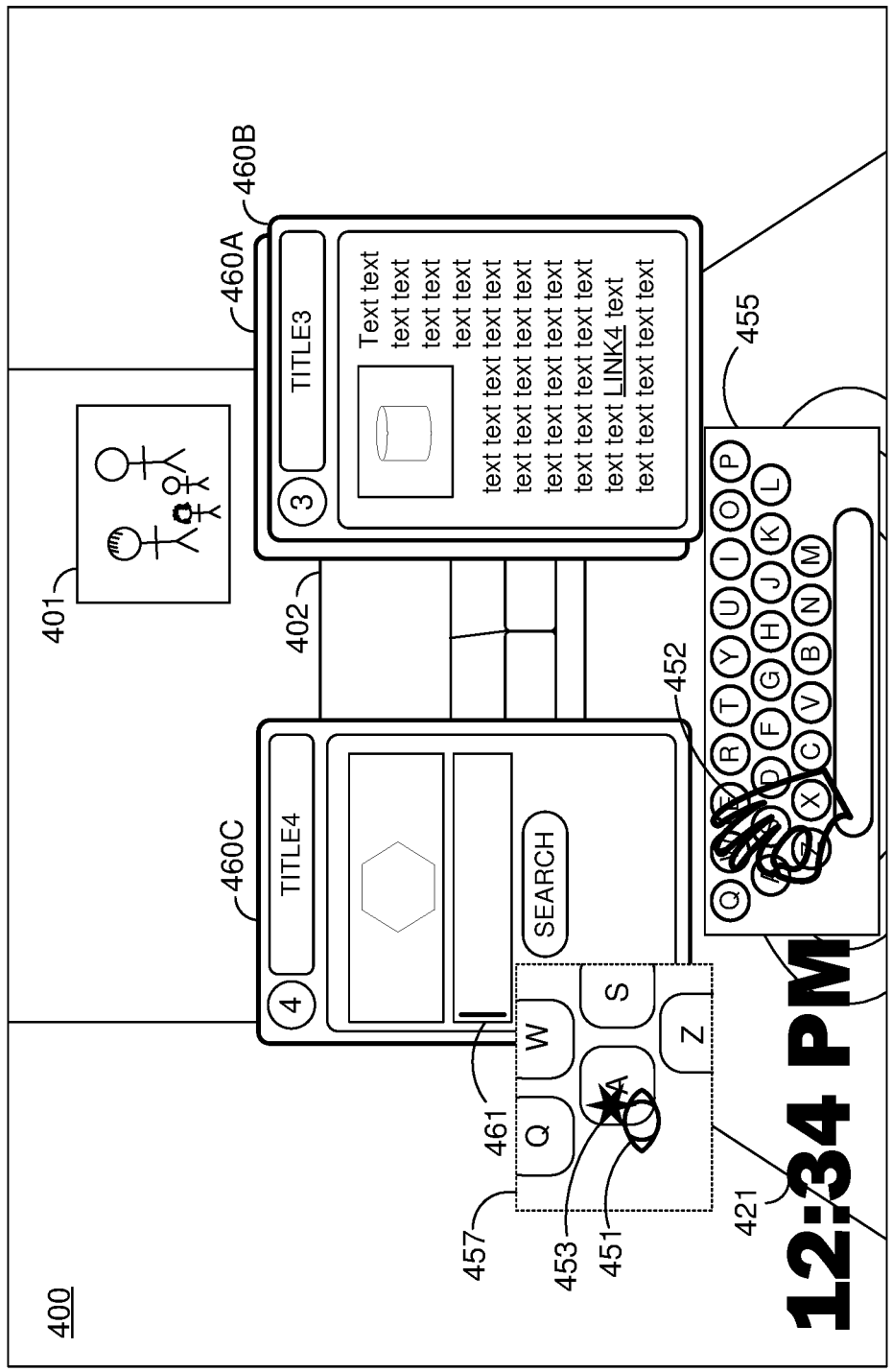
Figure 4H5

500

At a device including an input device, an eye tracker, a display, one or more processors, and non-transitory memory:

Displaying, on the display, a user interface element ⟵510

Receiving, via the input device, a user input from a user ⟵520

Determining, using the eye tracker, whether a gaze location of the user is at a location associated with the user interface element ⟵530

In response to determining that the user is looking at the user interface element, changing, based on the user input, the display in a first manner ⟵540

In response to determining that the user is not looking at the user interface element, changing, based on the user input, the display in a second manner different than the first manner ⟵550

Figure 5

METHODS AND SYSTEMS FOR CHANGING A DISPLAY BASED ON USER INPUT AND GAZE

CROSS-REFERENCE TO RELATED APPLICATIONS

This application is the national phase entry of Intl. Patent App. No. PCT/US2022/033399, filed on Jun. 14, 2022, which claims priority to U.S. Provisional Patent App. No. 63/215,872, filed on Jun. 28, 2021, which are both hereby incorporated by reference in their entirety.

TECHNICAL FIELD

The present disclosure generally relates to systems, methods, and devices for changing a display based on user input and gaze.

BACKGROUND

In various implementations, an electronic device includes multiple input devices. The electronic device interprets user interaction with the multiple input devices as various different user inputs.

BRIEF DESCRIPTION OF THE DRAWINGS

So that the present disclosure can be understood by those of ordinary skill in the art, a more detailed description may be had by reference to aspects of some illustrative implementations, some of which are shown in the accompanying drawings.

FIGS. 4A-4K illustrate an XR environment during various time periods in accordance with some implementations.

FIG. 5 is a flowchart representation of a method of displaying content in accordance with some implementations.

Figure 1:
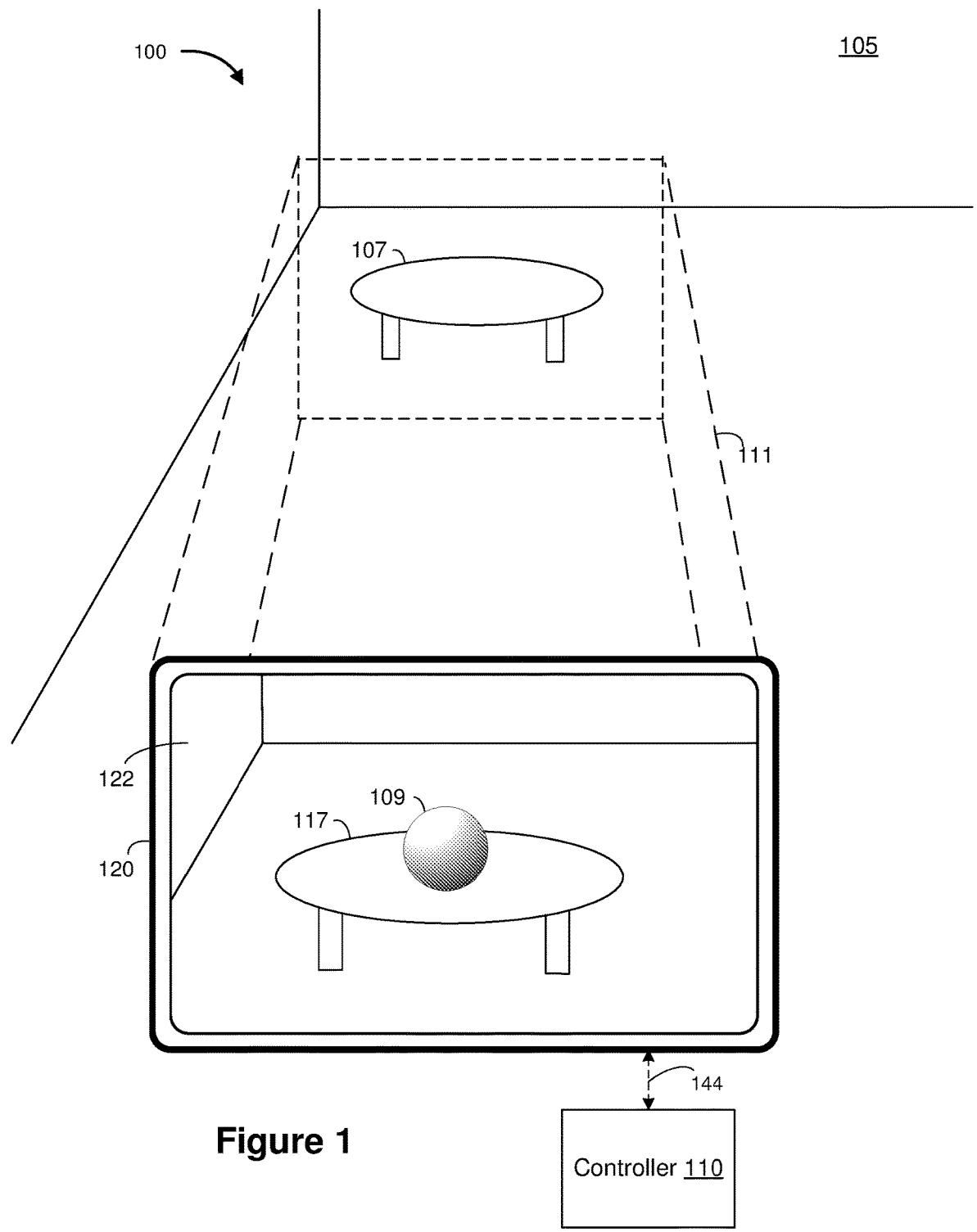
FIG. 1 is a block diagram of an example operating environment in accordance with some implementations.

In accordance with common practice the various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

SUMMARY

Various implementations disclosed herein include devices, systems, and methods for changing a display based on user input and gaze. In various implementations, the method is performed by a device including an input device, an eye tracker, a display, one or more processors, and non-transitory memory. The method includes displaying, on the display, a plurality of user interface elements. The method includes receiving, via the input device, a user input corresponding to an input location. The method includes determining, using the eye tracker, a gaze location. The method includes, in response to determining that the input location is at least a threshold distance away from the gaze location, activating a first user interface element at the gaze location. The method includes, in response to determining that the input location is within the threshold distance of the gaze location, activating a second user interface element at the input location.

DESCRIPTION

People may sense or interact with a physical environment or world without using an electronic device. Physical features, such as a physical object or surface, may be included within a physical environment. For instance, a physical environment may correspond to a physical city having physical buildings, roads, and vehicles. People may directly sense or interact with a physical environment through various means, such as smell, sight, taste, hearing, and touch. This can be in contrast to an extended reality (XR) environment that may refer to a partially or wholly simulated environment that people may sense or interact with using an electronic device. The XR environment may include virtual reality (VR) content, mixed reality (MR) content, augmented reality (AR) content, or the like. Using an XR system, a portion of a person's physical motions, or representations thereof, may be tracked and, in response, properties of virtual objects in the XR environment may be changed in a way that complies with at least one law of nature. For example, the XR system may detect a user's head movement and adjust auditory and graphical content presented to the user in a way that simulates how sounds and views would change in a physical environment. In other examples, the XR system may detect movement of an electronic device (e.g., a laptop, tablet, mobile phone, or the like) presenting the XR environment. Accordingly, the XR system may adjust auditory and graphical content presented to the user in a way that simulates how sounds and views would change in a physical environment. In some instances, other inputs, such as a representation of physical motion (e.g., a voice command), may cause the XR system to adjust properties of graphical content.

Numerous types of electronic systems may allow a user to sense or interact with an XR environment. A non-exhaustive list of examples includes lenses having integrated display capability to be placed on a user's eyes (e.g., contact lenses), heads-up displays (HUDs), projection-based systems, head mountable systems, windows or windshields having integrated display technology, headphones/earphones, input systems with or without haptic feedback (e.g., handheld or wearable controllers), smartphones, tablets, desktop/laptop computers, and speaker arrays. Head mountable systems may include an opaque display and one or more speakers. Other head mountable systems may be configured to receive an opaque external display, such as that of a smartphone. Head mountable systems may capture images/video of the physical environment using one or more image sensors or capture audio of the physical environment using one or more microphones. Instead of an opaque display, some head mountable systems may include a transparent or translucent display. Transparent or translucent displays may direct light representative of images to a user's eyes through a medium, such as a hologram medium, optical waveguide, an optical combiner, optical reflector, other similar technologies, or combinations thereof. Various display technologies, such as liquid crystal on silicon, LEDs, uLEDs, OLEDs, laser scanning light source, digital light projection, or combinations thereof, may be used. In some examples, the transparent or translucent display may be selectively controlled to become opaque. Projection-based systems may utilize retinal projection technology that projects images onto a user's retina or may project virtual content into the physical environment, such as onto a physical surface or as a hologram.

Numerous details are described in order to provide a thorough understanding of the example implementations shown in the drawings. However, the drawings merely show some example aspects of the present disclosure and are therefore not to be considered limiting. Those of ordinary skill in the art will appreciate that other effective aspects and/or variants do not include all of the specific details described herein. Moreover, well-known systems, methods, components, devices, and circuits have not been described in exhaustive detail so as not to obscure more pertinent aspects of the example implementations described herein.

User input from a user interacting with a user interface element is interpreted differently based on whether or not a gaze location of the user is at a location associated with the user interface element.

FIG. 1 is a block diagram of an example operating environment 100 in accordance with some implementations. While pertinent features are shown, those of ordinary skill in the art will appreciate from the present disclosure that various other features have not been illustrated for the sake of brevity and so as not to obscure more pertinent aspects of the example implementations disclosed herein. To that end, as a non-limiting example, the operating environment 100 includes a controller 110 and an electronic device 120.

In some implementations, the controller 110 is configured to manage and coordinate an XR experience for the user. In some implementations, the controller 110 includes a suitable combination of software, firmware, and/or hardware. The controller 110 is described in greater detail below with respect to FIG. 2. In some implementations, the controller 110 is a computing device that is local or remote relative to the physical environment 105. For example, the controller 110 is a local server located within the physical environment 105. In another example, the controller 110 is a remote server located outside of the physical environment 105 (e.g., a cloud server, central server, etc.). In some implementations, the controller 110 is communicatively coupled with the electronic device 120 via one or more wired or wireless communication channels 144 (e.g., BLUETOOTH, IEEE 802.11x, IEEE 802.16x, IEEE 802.3x, etc.). In another example, the controller 110 is included within the enclosure of the electronic device 120. In some implementations, the functionalities of the controller 110 are provided by and/or combined with the electronic device 120.

In some implementations, the electronic device 120 is configured to provide the XR experience to the user. In some implementations, the electronic device 120 includes a suitable combination of software, firmware, and/or hardware. According to some implementations, the electronic device 120 presents, via a display 122, XR content to the user while the user is physically present within the physical environment 105 that includes a table 107 within the field-of-view 111 of the electronic device 120. As such, in some implementations, the user holds the electronic device 120 in his/her hand(s). In some implementations, while providing XR content, the electronic device 120 is configured to display an XR object (e.g., an XR sphere 109) and to enable video pass-through of the physical environment 105 (e.g., including a representation 117 of the table 107) on a display 122. The electronic device 120 is described in greater detail below with respect to FIG. 3.

According to some implementations, the electronic device 120 provides an XR experience to the user while the user is virtually and/or physically present within the physical environment 105.

In some implementations, the user wears the electronic device 120 on his/her head. For example, in some implementations, the electronic device includes a head-mounted system (HMS), head-mounted device (HMD), or head-mounted enclosure (HME). As such, the electronic device 120 includes one or more XR displays provided to display the XR content. For example, in various implementations, the electronic device 120 encloses the field-of-view of the user. In some implementations, the electronic device 120 is a handheld device (such as a smartphone or tablet) configured to present XR content, and rather than wearing the electronic device 120, the user holds the device with a display directed towards the field-of-view of the user and a camera directed towards the physical environment 105. In some implementations, the handheld device can be placed within an enclosure that can be worn on the head of the user. In some implementations, the electronic device 120 is replaced with an XR chamber, enclosure, or room configured to present XR content in which the user does not wear or hold the electronic device 120.

Figure 2:
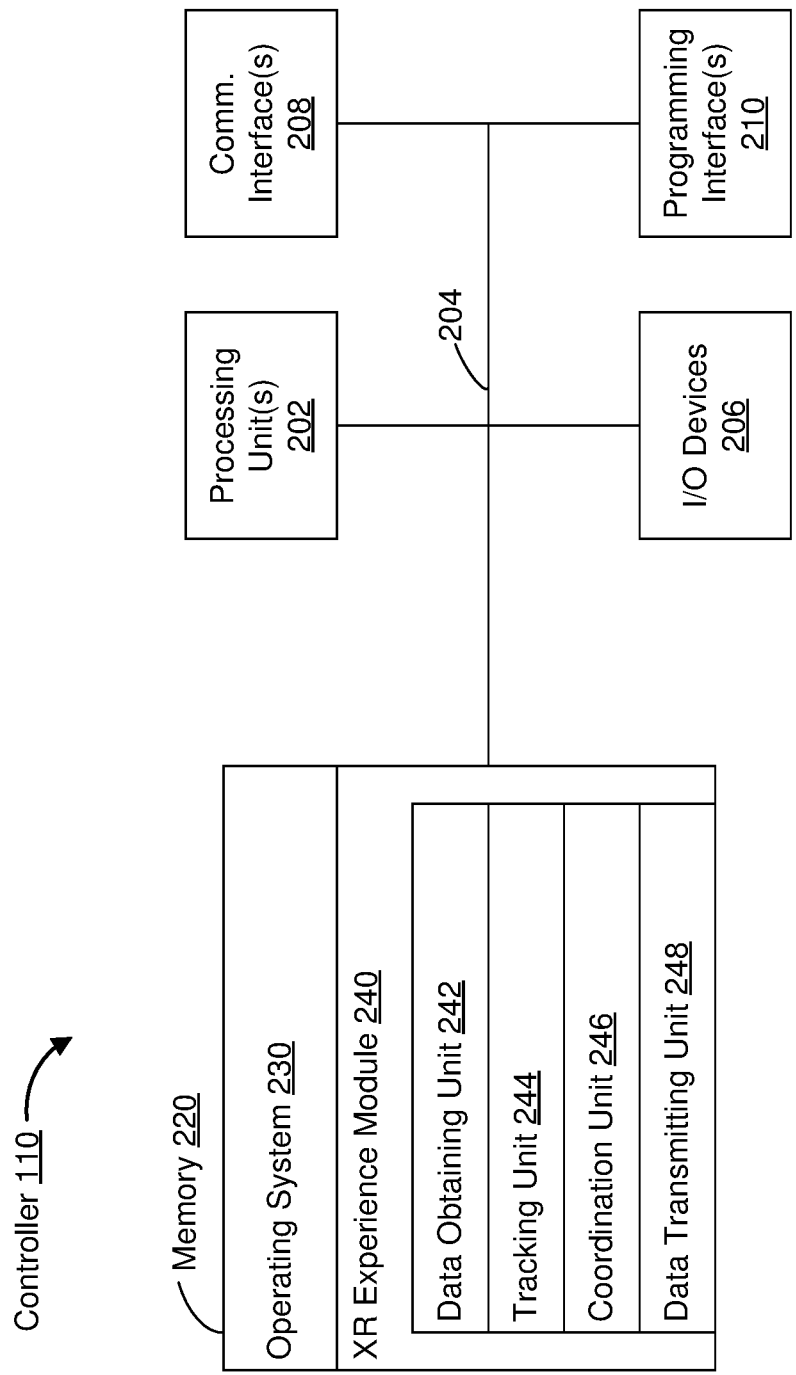
FIG. 2 is a block diagram of an example controller in accordance with some implementations.

FIG. 2 is a block diagram of an example of the controller 110 in accordance with some implementations. While certain specific features are illustrated, those skilled in the art will appreciate from the present disclosure that various other features have not been illustrated for the sake of brevity, and so as not to obscure more pertinent aspects of the implementations disclosed herein. To that end, as a non-limiting example, in some implementations the controller 110 includes one or more processing units 202 (e.g., microprocessors, application-specific integrated-circuits (ASICs), field-programmable gate arrays (FPGAs), graphics processing units (GPUs), central processing units (CPUs), processing cores, and/or the like), one or more input/output (I/O) devices 206, one or more communication interfaces 208 (e.g., universal serial bus (USB), FIREWIRE, THUNDERBOLT, IEEE 802.3x, IEEE 802.11x, IEEE 802.16x, global system for mobile communications (GSM), code division multiple access (CDMA), time division multiple access (TDMA), global positioning system (GPS), infrared (IR), BLUETOOTH, ZIGBEE, and/or the like type interface), one or more programming (e.g., I/O) interfaces 210, a memory 220, and one or more communication buses 204 for interconnecting these and various other components.

In some implementations, the one or more communication buses 204 include circuitry that interconnects and controls communications between system components. In some implementations, the one or more I/O devices 206 include at least one of a keyboard, a mouse, a touchpad, a joystick, one or more microphones, one or more speakers, one or more image sensors, one or more displays, and/or the like.

The memory 220 includes high-speed random-access memory, such as dynamic random-access memory (DRAM), static random-access memory (SRAM), double-data-rate random-access memory (DDR RAM), or other random-access solid-state memory devices. In some implementations, the memory 220 includes non-volatile memory, such as one or more magnetic disk storage devices, optical disk storage devices, flash memory devices, or other non-volatile solid-state storage devices. The memory 220 optionally includes one or more storage devices remotely located from the one or more processing units 202. The memory 220 comprises a non-transitory computer readable storage medium. In some implementations, the memory 220 or the non-transitory computer readable storage medium of the memory 220 stores the following programs, modules and data structures, or a subset thereof including an optional operating system 230 and an XR experience module 240.

The operating system 230 includes procedures for handling various basic system services and for performing hardware dependent tasks. In some implementations, the XR experience module 240 is configured to manage and coordinate one or more XR experiences for one or more users (e.g., a single XR experience for one or more users, or multiple XR experiences for respective groups of one or more users). To that end, in various implementations, the XR experience module 240 includes a data obtaining unit 242, a tracking unit 244, a coordination unit 246, and a data transmitting unit 248.

In some implementations, the data obtaining unit 242 is configured to obtain data (e.g., presentation data, interaction data, sensor data, location data, etc.) from at least the electronic device 120 of FIG. 1. To that end, in various implementations, the data obtaining unit 242 includes instructions and/or logic therefor, and heuristics and metadata therefor.

In some implementations, the tracking unit 244 is configured to map the physical environment 105 and to track the position/location of at least the electronic device 120 with respect to the physical environment 105 of FIG. 1. To that end, in various implementations, the tracking unit 244 includes instructions and/or logic therefor, and heuristics and metadata therefor.

In some implementations, the coordination unit 246 is configured to manage and coordinate the XR experience presented to the user by the electronic device 120. To that end, in various implementations, the coordination unit 246 includes instructions and/or logic therefor, and heuristics and metadata therefor.

In some implementations, the data transmitting unit 248 is configured to transmit data (e.g., presentation data, location data, etc.) to at least the electronic device 120. To that end, in various implementations, the data transmitting unit 248 includes instructions and/or logic therefor, and heuristics and metadata therefor.

Although the data obtaining unit 242, the tracking unit 244, the coordination unit 246, and the data transmitting unit 248 are shown as residing on a single device (e.g., the controller 110), it should be understood that in other implementations, any combination of the data obtaining unit 242, the tracking unit 244, the coordination unit 246, and the data transmitting unit 248 may be located in separate computing devices.

Moreover, FIG. 2 is intended more as functional description of the various features that may be present in a particular implementation as opposed to a structural schematic of the implementations described herein. As recognized by those of ordinary skill in the art, items shown separately could be combined and some items could be separated. For example, some functional modules shown separately in FIG. 2 could be implemented in a single module and the various functions of single functional blocks could be implemented by one or more functional blocks in various implementations. The actual number of modules and the division of particular functions and how features are allocated among them will vary from one implementation to another and, in some implementations, depends in part on the particular combination of hardware, software, and/or firmware chosen for a particular implementation.

Figure 3:
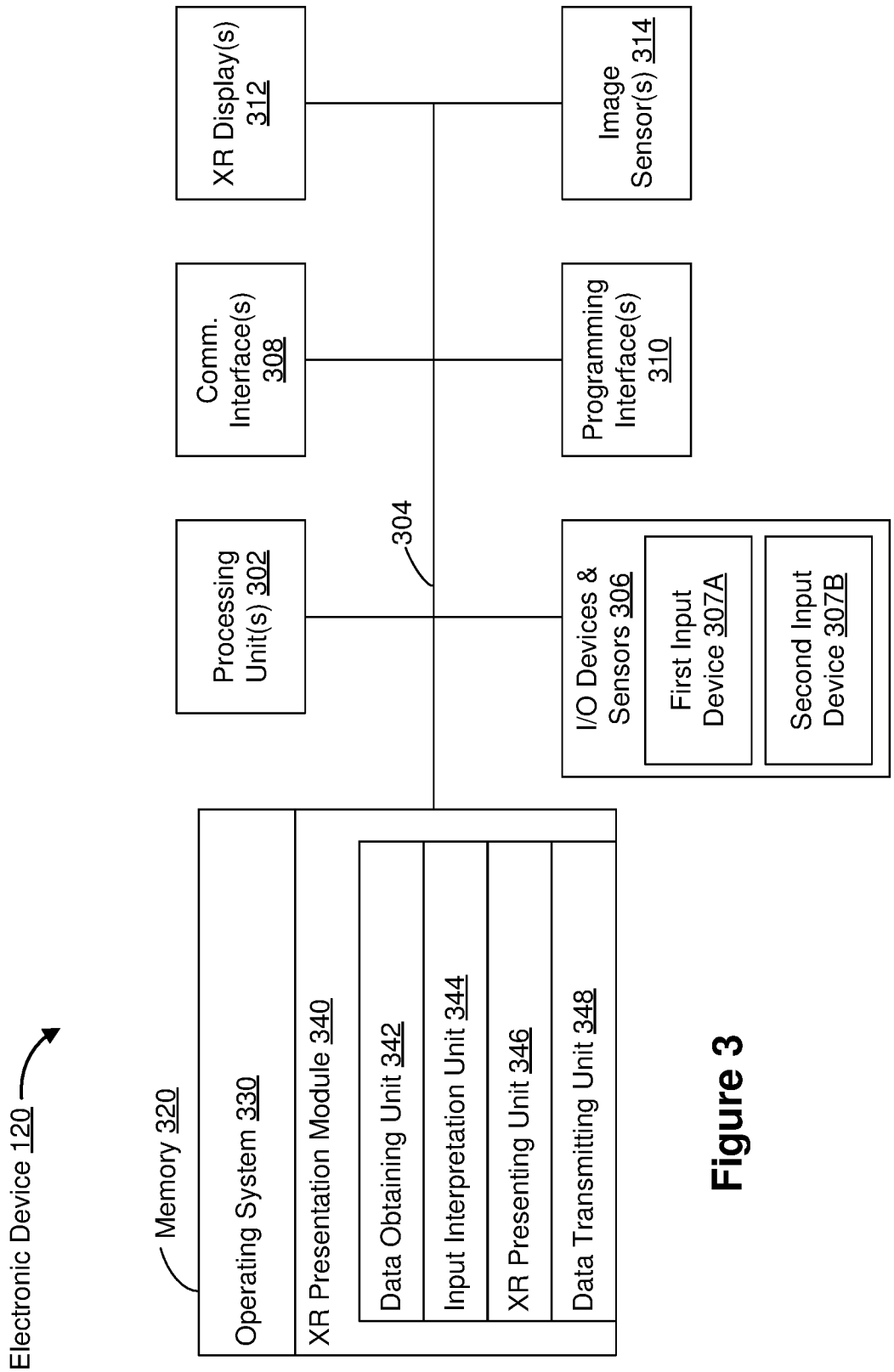
FIG. 3 is a block diagram of an example electronic device in accordance with some implementations.

FIG. 3 is a block diagram of an example of the electronic device 120 in accordance with some implementations. While certain specific features are illustrated, those skilled in the art will appreciate from the present disclosure that various other features have not been illustrated for the sake of brevity, and so as not to obscure more pertinent aspects of the implementations disclosed herein. To that end, as a non-limiting example, in some implementations the electronic device 120 includes one or more processing units 302 (e.g., microprocessors, ASICs, FPGAs, GPUs, CPUs, processing cores, and/or the like), one or more input/output (I/O) devices and sensors 306, one or more communication interfaces 308 (e.g., USB, FIREWIRE, THUNDERBOLT, IEEE 802.3x, IEEE 802.11x, IEEE 802.16x, GSM, CDMA, TDMA, GPS, IR, BLUETOOTH, ZIGBEE, and/or the like type interface), one or more programming (e.g., I/O) interfaces 310, one or more XR displays 312, one or more optional interior- and/or exterior-facing image sensors 314, a memory 320, and one or more communication buses 304 for interconnecting these and various other components.

In some implementations, the one or more communication buses 304 include circuitry that interconnects and controls communications between system components. In some implementations, the one or more I/O devices and sensors 306 include at least one of an inertial measurement unit (IMU), an accelerometer, a gyroscope, a thermometer, one or more physiological sensors (e.g., blood pressure monitor, heart rate monitor, blood oxygen sensor, blood glucose sensor, etc.), one or more microphones, one or more speakers, a haptics engine, one or more depth sensors (e.g., a structured light, a time-of-flight, or the like), and/or the like.

In some implementations, the I/O devices and sensors 306 includes a plurality of input devices, including a first input device 307A and a second input device 307B. In some implementations, the first input device 307A includes a hand gesture detector. For example, in some implementations, the first input device 307A includes a camera that obtains images of the hands of the user and a module that detects hand gestures in the images of the hands of the user. In some implementations, the second input device 307B includes a gaze tracker. For example, in some implementations, the second input device 307B includes a camera that obtains images of the eyes of the user and a module that determines a gaze direction and/or gaze location of the user based on the images of the eyes of the user.

In some implementations, the one or more XR displays 312 are configured to provide the XR experience to the user. In some implementations, the one or more XR displays 312 correspond to holographic, digital light processing (DLP), liquid-crystal display (LCD), liquid-crystal on silicon (LCoS), organic light-emitting field-effect transitory (OLET), organic light-emitting diode (OLED), surface-conduction electron-emitter display (SED), field-emission display (FED), quantum-dot light-emitting diode (QD-LED), micro-electro-mechanical system (MEMS), and/or the like display types. In some implementations, the one or more XR displays 312 correspond to diffractive, reflective, polarized, holographic, etc. waveguide displays. For example, the electronic device 120 includes a single XR display. In another example, the electronic device includes an XR display for each eye of the user. In some implementations, the one or more XR displays 312 are capable of presenting MR and VR content.

In some implementations, the one or more image sensors 314 are configured to obtain image data that corresponds to at least a portion of the face of the user that includes the eyes of the user (any may be referred to as an eye-tracking camera). In some implementations, the one or more image sensors 314 are configured to be forward-facing so as to obtain image data that corresponds to the scene as would be viewed by the user if the electronic device 120 was not present (and may be referred to as a scene camera). The one or more optional image sensors 314 can include one or more RGB cameras (e.g., with a complimentary metal-oxide-semiconductor (CMOS) image sensor or a charge-coupled device (CCD) image sensor), one or more infrared (IR) cameras, one or more event-based cameras, and/or the like.

The memory 320 includes high-speed random-access memory, such as DRAM, SRAM, DDR RAM, or other random-access solid-state memory devices. In some implementations, the memory 320 includes non-volatile memory, such as one or more magnetic disk storage devices, optical disk storage devices, flash memory devices, or other non-volatile solid-state storage devices. The memory 320 optionally includes one or more storage devices remotely located from the one or more processing units 302. The memory 320 comprises a non-transitory computer readable storage medium. In some implementations, the memory 320 or the non-transitory computer readable storage medium of the memory 320 stores the following programs, modules and data structures, or a subset thereof including an optional operating system 330 and an XR presentation module 340.

The operating system 330 includes procedures for handling various basic system services and for performing hardware dependent tasks. In some implementations, the XR presentation module 340 is configured to present XR content to the user via the one or more XR displays 312. To that end, in various implementations, the XR presentation module 340 includes a data obtaining unit 342, an input interpretation unit 344, an XR presenting unit 346, and a data transmitting unit 348.

In some implementations, the data obtaining unit 342 is configured to obtain data (e.g., presentation data, interaction data, sensor data, location data, etc.) from at least the controller 110 of FIG. 1. To that end, in various implementations, the data obtaining unit 342 includes instructions and/or logic therefor, and heuristics and metadata therefor.

In some implementations, the input interpretation unit 344 is configured to receive user input from multiple input devices (e.g., the first input device 307A and the second input device 307B) and generate application commands based on the user input from the multiple input devices. To that end, in various implementations, the input interpretation unit 344 includes instructions and/or logic therefor, and heuristics and metadata therefor.

In some implementations, the XR presenting unit 346 is configured to present XR content via the one or more XR displays 312, such as a representation of the selected text input field at a location proximate to the text input device. To that end, in various implementations, the XR presenting unit 346 includes instructions and/or logic therefor, and heuristics and metadata therefor.

In some implementations, the data transmitting unit 348 is configured to transmit data (e.g., presentation data, location data, etc.) to at least the controller 110. In some implementations, the data transmitting unit 348 is configured to transmit authentication credentials to the electronic device. To that end, in various implementations, the data transmitting unit 348 includes instructions and/or logic therefor, and heuristics and metadata therefor.

Although the data obtaining unit 342, the input interpretation unit 344, the XR presenting unit 346, and the data transmitting unit 348 are shown as residing on a single device (e.g., the electronic device 120), it should be understood that in other implementations, any combination of the data obtaining unit 342, the input interpretation unit 344, the XR presenting unit 346, and the data transmitting unit 348 may be located in separate computing devices.

Moreover, FIG. 3 is intended more as a functional description of the various features that could be present in a particular implementation as opposed to a structural schematic of the implementations described herein. As recognized by those of ordinary skill in the art, items shown separately could be combined and some items could be separated. For example, some functional modules shown separately in FIG. 3 could be implemented in a single module and the various functions of single functional blocks could be implemented by one or more functional blocks in various implementations. The actual number of modules and the division of particular functions and how features are allocated among them will vary from one implementation to another and, in some implementations, depends in part on the particular combination of hardware, software, and/or firmware chosen for a particular implementation.

FIGS. 4A-4K illustrate an XR environment 400 displayed, at least in part, by a display of the electronic device. The XR environment 400 is based on a physical environment of a living room in which the electronic device is present. FIGS. 4A-4K illustrate the XR environment 400 during a series of time periods. In various implementations, each time period is an instant, a fraction of a second, a few seconds, a few hours, a few days, or any length of time.

The XR environment 400 includes a plurality of objects, including one or more physical objects (e.g., a picture 401 and a couch 402) of the physical environment and one or more virtual objects (e.g., a first content pane 460A and a virtual clock 421). In various implementations, certain objects (such as the physical objects 401 and 402 and the first content pane 460A) are displayed at a location in the XR environment 400, e.g., at a location defined by three coordinates in a three-dimensional (3D) XR coordinate system. Accordingly, when the electronic device moves in the XR environment 400 (e.g., changes either position and/or orientation), the objects are moved on the display of the electronic device, but retain their location in the XR environment 400. Such virtual objects that, in response to motion of the electronic device, move on the display, but retain their position in the XR environment are referred to as world-locked objects. In various implementations, certain virtual objects (such as the virtual clock 421) are displayed at locations on the display such that when the electronic device moves in the XR environment 400, the objects are stationary on the display on the electronic device. Such virtual objects that, in response to motion of the electronic device, retain their location on the display are referred to as head-locked objects or display-locked objects.

FIGS. 4A-4K illustrate a gaze location indicator 451 that indicates a gaze location of the user, e.g., where in the XR environment 400 the user is looking. Although the gaze location indicator 451 is illustrated in FIGS. 4A-4K, in various implementations, the gaze location indicator 451 is not displayed by the electronic device.

FIGS. 4A-4K illustrate a right hand 452 of a user. To better illustrate interaction of the right hand 452 with virtual objects such as user interface elements, the right hand 452 is illustrated as transparent.

Figure 4A:
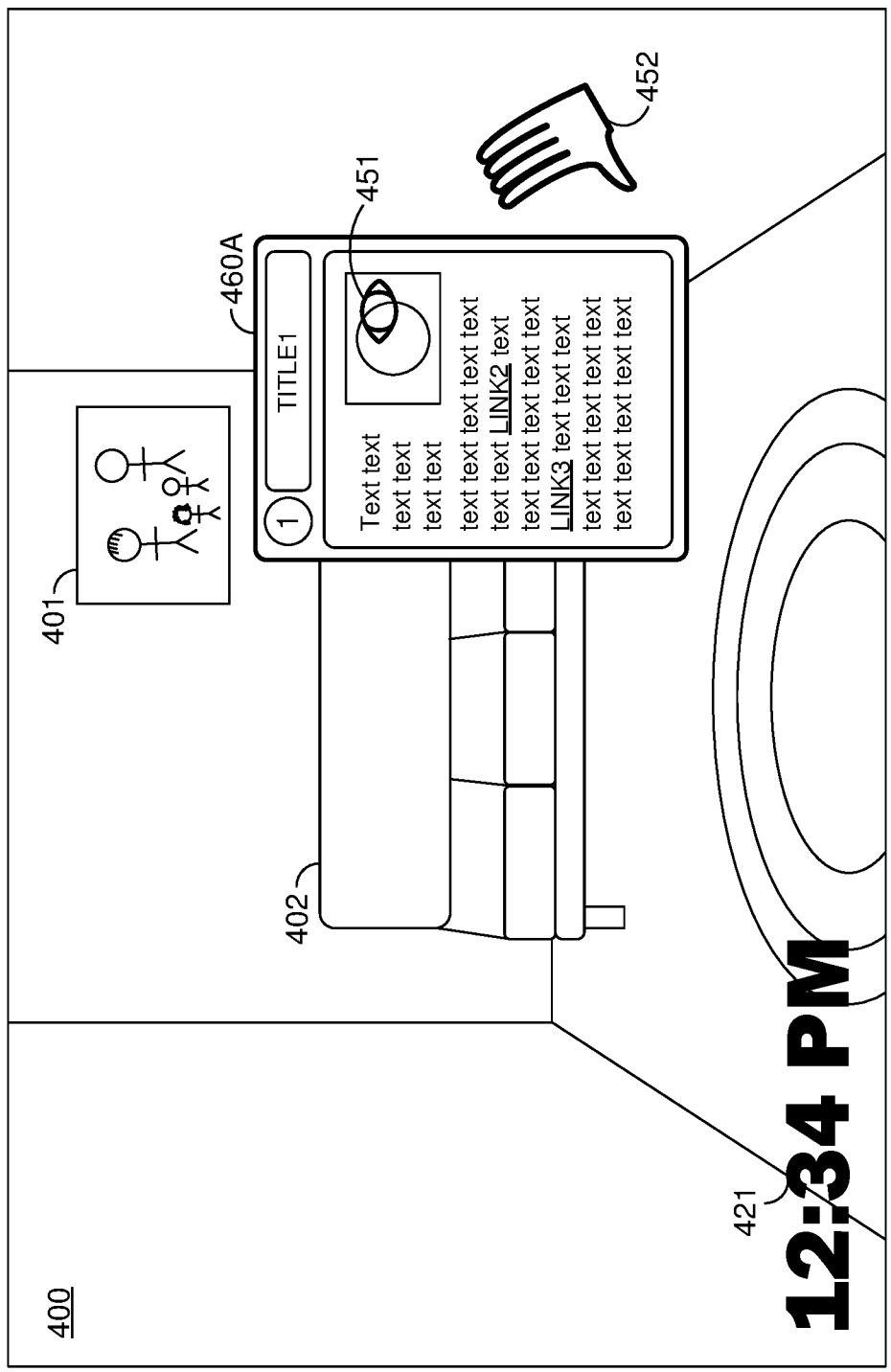

FIG. 4A illustrates the XR environment 400 during a first time period. During the first time period, the electronic device displays the first content pane 460A at a first location in the XR environment 400. The first content pane 460A includes, at the top of the first content pane 460A, a first icon and a first title (labeled "TITLE1"). The first content pane 460A further includes first content including a first image and first text. The first text includes a link to second content (labeled "LINK2") and a link to third content (labeled "LINK3"). In various implementations, the first content is a first webpage, the link to the second content is a link to a second webpage, and the link to the third content is a link to a third webpage. Thus, in various implementations, the first content pane 460A is a content pane of a web browser.

The first content pane 460A spans a two-dimensional plane in a horizontal direction (e.g., an x-direction) and a vertical direction (e.g., y-direction). The first content pane 460A further defines a depth direction (e.g., a z-direction) perpendicular to first content pane 460A.

During the first time period, the gaze location indicator 451 indicates that the gaze location of the user is at a location of the first image. During the first time period, the right hand 452 is in a neutral position.

FIGS. 4B1-4B3 illustrate the XR environment 400 with various user inputs to replace the first content in the first content pane 460A with the second content in the first content pane 460A.

FIG. 4B1 illustrates the XR environment 400 during a second time period subsequent to the first time period. During the second time period, the gaze location indicator 451 indicates that the gaze location of the user is at a location of the link to the second content. During the second time period, the right hand 452 performs a pinch gesture at the location of the link to the second content (as illustrated in FIG. 4B1) and a release gesture within a threshold amount of time of the pinch gesture. In various implementations, if the release gesture is performed after at least the threshold amount of time, the second content is displayed in a second content pane in a stack with the first content pane 460A. In various implementations, the right hand 452 performs a pinch gesture at the location of the link to the second content and a release gesture at the same location. In various implementations, if the release gesture is performed at a location in front of the first content pane 460A (e.g., closer to the user in the z-direction), the second content is displayed in a second content pane in a stack with the first content pane 460A. In various implementations, if the release gesture is performed at an open location, the second content is displayed in a second content pane in a new stack. In various implementations, a user performs a pinch gesture by contacting a fingertip of the index finger to the fingertip of the thumb. In various implementations, a user performs a release gesture by ceasing contact of the index finger and the thumb. However, in various implementations, other gestures may correspond to a pinch gesture or release gesture.

FIG. 4B2 illustrates an alternative implementation of the XR environment 400 during the second time period. During the second time period, the gaze location indicator 451 indicates that the gaze location of the user is at the location of the link to the second content. During the second time period, the right hand 452 performs a pinch gesture at a location at least a threshold distance from the location of the link to the second content (as illustrated in FIG. 4B2) and a release gesture within a threshold amount of time after the pinch gesture. In various implementations, if the release gesture is performed after at least the threshold amount of time, the second content is displayed in a second content pane in a stack with the first content pane 460A. In various implementations, the right hand 452 performs a pinch gesture at the location at least a threshold distance from the location of the link to the second content and a release gesture at the same location. In various implementations, if the release gesture is performed at a location in front of the location of the pinch gesture (e.g., closer to the user in the z-direction), the second content is displayed in a second content pane in a stack with the first content pane 460A. In various implementations, if the release gesture is performed laterally away from the location of the pinch gesture (e.g., laterally by an amount corresponding to a distance between the link to the second content and an open location), the second content is displayed in a second content pane in a new stack (as illustrated, e.g., in FIG. 4G). In various implementations, a user performs a pinch gesture by contacting a fingertip of the index finger to the fingertip of the thumb. In various implementations, a user performs a release gesture by ceasing contact of the index finger and the thumb. However, in various implementations, other gestures may correspond to a pinch gesture or release gesture.

In various implementations, the location at least a threshold distance from the location of the link to the second content is at least a threshold distance from any user interface element. In various implementations, if the location is within the threshold distance of another user interface element, the hand gesture is, depending on the user interface element, interpreted as interacting with that user interface element or the user interface element at which the user is looking. For example, a user may interact with a virtual keyboard without looking at it. As another example, a user may inadvertently perform a hand gesture at the location of a link to other content while looking the link to the second content while intending to interact with the link to the second content.

In various implementations, the location is at least a threshold distance from the gaze location of the user. In various implementations, if the location is within the threshold distance from the gaze location of the user, the hand gesture is interpreted as interacting with the user interface element at the location of the hand gesture, as illustrated below in FIG. 4B3.

FIG. 4B3 illustrates an alternative implementation of the XR environment 400 during the second time period. During the second time period, the gaze location indicator 451 indicates that the gaze location of the user is at a location of the link to the third content, but within a threshold distance of the link to the second content. During the second time period, the right hand 452 performs a pinch gesture at the location of the link to the second content (as illustrated in FIG. 4B3) and a release gesture within a threshold amount of time after the pinch gesture. In various implementations, if the release gesture is performed after at least the threshold amount of time, the second content is displayed in a second content pane in a stack with the first content pane 460A. In various implementations, the right hand 452 performs a pinch gesture at the location the link to the second content and a release gesture at the same location. In various implementations, if the release gesture is performed at a location in front of the first content pane 460A (e.g., closer to the user in the z-direction), the second content is displayed in a second content pane in a stack with the first content pane 460A. In various implementations, if the release gesture is performed at an open location, the second content is displayed in a second content pane in a new stack (as illustrated, e.g., in FIG. 4G). In various implementations, a user performs a pinch gesture by contacting a fingertip of the index finger to the fingertip of the thumb. In various implementations, a user performs a release gesture by ceasing contact of the index finger and the thumb. However, in various implementations, other gestures may correspond to a pinch gesture or release gesture.

In various implementations, if the hand gesture were performed at least a threshold distance away from the gaze location of the user, the hand gesture is interpreted as interacting with the user interface element at which the user is looking, e.g., the link to the third content.

Accordingly, in various implementations, performing a hand gesture at a location at least a threshold distance away from the user interface element while looking at the user interface element is interpreted as intentionally interacting with the user interface element. Similarly, in various implementations, performing a hand gesture at the location of a user interface element within a threshold distance of the gaze location of the user is interpreted as intentionally interacting with the user interface element. In various implementations, performing a hand gesture at the location of a user interface element while not looking at the user interface element is interpreted as inadvertently interacting with the user interface element and the presence of the unnoticed (or not looked at) user interface element is ignored. However, in various implementations, performing a gesture at the location of a user interface element while not looking at the user interface element is interpreted as intentionally interacting with the user interface element, such as when the user interface element is a key of a virtual keyboard.

Figure 4C:
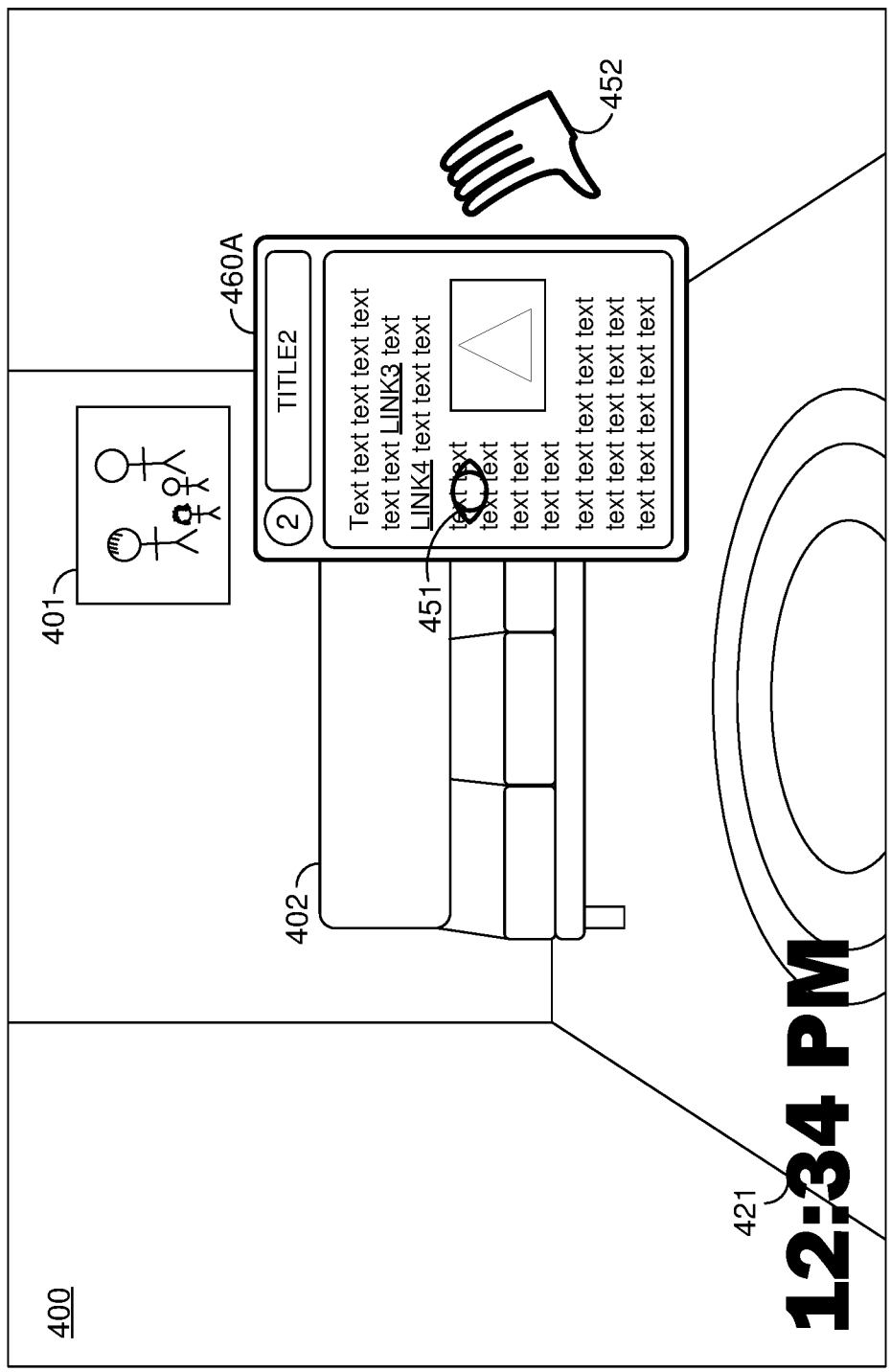

FIG. 4C illustrates the XR environment 400 during a third time period subsequent to the second time period. During the third time period, in response to detecting the user input of any of FIGS. 4B1-4B3, the first content pane 460A includes, at the top of the first content pane 460A, a second icon and a second title (labeled "TITLE2"). The first content pane 460A further includes the second content including a second image and second text. The second text includes the link to the third content (labeled "LINK3") and a link to fourth content (labeled "LINK4"). In various implementations, the link to the fourth content is a link to a fourth webpage.

Accordingly, in various implementations, a webpage is displayed in an existing content pane in response to detecting a hand gesture (e.g., a pinch-and-release gesture) from a user while a gaze location of the user is at a location associated with a link to the webpage. In various implementations, the hand gesture is performed at a location at which the link to the webpage is displayed while a gaze location of the user is at the location at which the link to the webpage is displayed (as illustrated in FIG. 4B1) or at least within a threshold distance of that location (as illustrated in FIG. 4B3). In various implementations, the hand gesture is performed at a location at least a threshold distance from the location at which the link to the webpage is displayed (and, in various implementations, at least a threshold distance from any user interface element) while the gaze location of the user is at the location at which the link to the webpage is displayed (as illustrated in FIG. 4B2).

During the third time period, the gaze location indicator 451 indicates that the gaze location of the user is at a location of the second text. During the third time period, the right hand 452 is in a neutral position.

FIGS. 4D1-4D3 illustrate the XR environment 400 with various user inputs to replace display the second content in a second content pane 460B in a stack with the first content pane 460A.

FIG. 4D1 illustrates the XR environment 400 during a fourth time period subsequent to the third time period. During the fourth time period, the gaze location indicator 451 indicates that the gaze location of the user is at a location of the link to the third content. During the fourth time period, the right hand 452 performs a pinch gesture at the location of the link to the third content (as illustrated in FIG. 4D1) and a release gesture at a location of the first content pane 460A more than the threshold amount of time after the pinch gesture. In various implementations, the release gesture is performed at a location in front of the first content pane 460A after any amount of time.

FIG. 4D2 illustrates an alternative implementation of the XR environment 400 during the fourth time period. During the fourth time period, the gaze location indicator 451 indicates that the gaze location of the user is at the location of the link to the third content. During the fourth time period, the right hand 452 performs a pinch gesture at a location at least a threshold distance away from the link to the third content (as illustrated in FIG. 4D2) and a release gesture a relative position away from the location of the pinch gesture more than the threshold amount of time after the pinch gesture, wherein a location the relative position away from the location of the link to the third content is a location of the first content pane 460A. In various implementations, the release gesture is performed a relative position away from the location of the pinch gesture after any amount of time, wherein a location the relative position away from the location of the link to the third content is in front of the first content pane 460A. For example, in the release gesture is performed approximately in front of the pinch gesture. In various implementations, the location at least a threshold distance from the location of the link to the third content is at least a threshold distance from any user interface element. In various implementations, the location is at least a threshold distance from the gaze location of the user.

FIG. 4D3 illustrates an alternative implementation of the XR environment 400 during the fourth time period. During the fourth time period, the gaze location indicator 451 indicates that the gaze location of the user is at the location of the link to the fourth content, but within a threshold distance of the link to the third content. During the fourth time period, the right hand 452 performs a pinch gesture at the location of the link to the third content (as illustrated in FIG. 4D3) and a release gesture at a location of the first content pane 460A more than the threshold amount of time after the pinch gesture. In various implementations, the release gesture is performed at a location in front of the first content pane 460A after any amount of time.

Figure 4E:
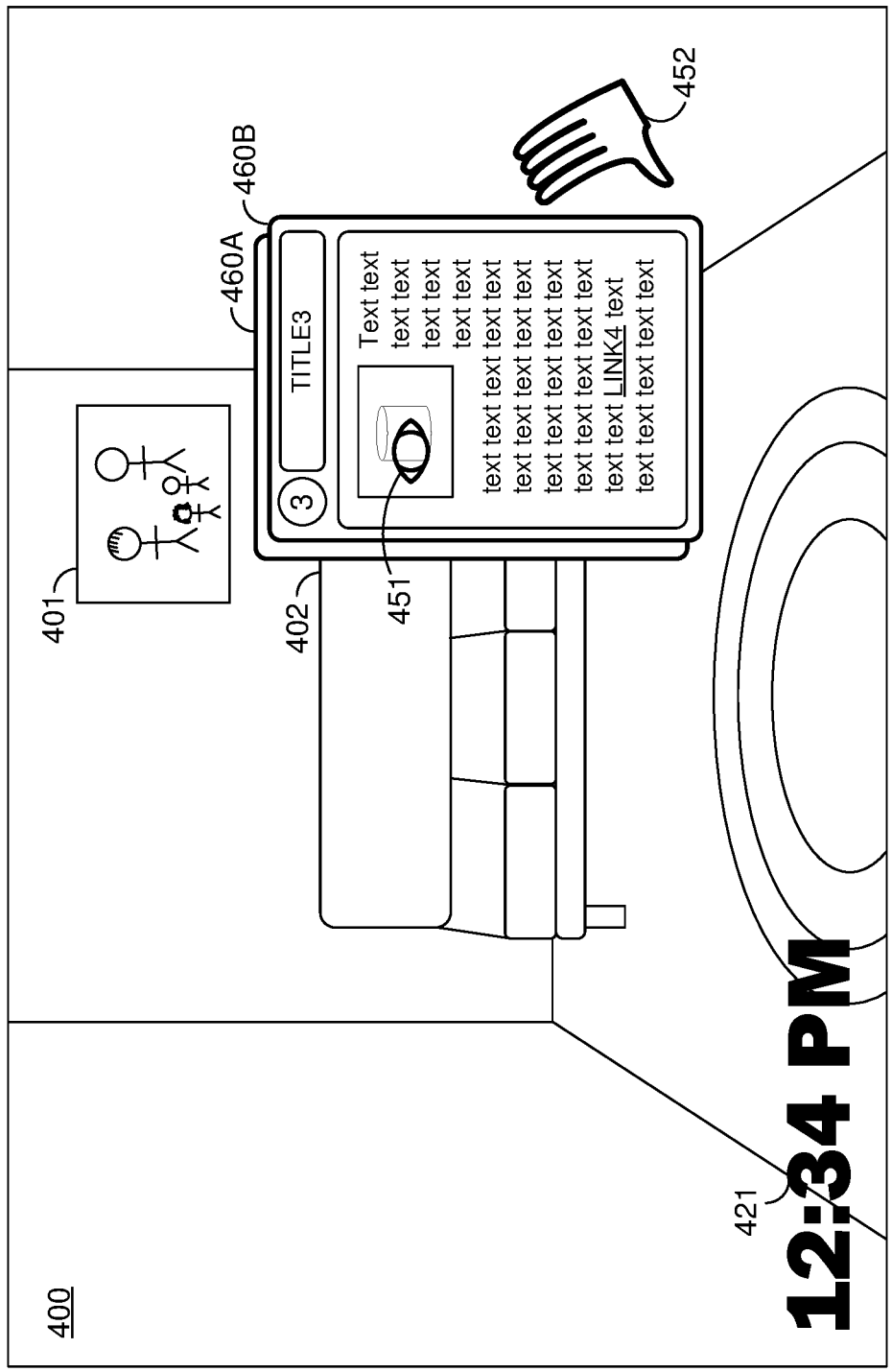

FIG. 4E illustrates the XR environment 400 during a fifth time period subsequent to the fourth time period. During the fifth time period, in response to detecting the user input of any of FIGS. 4D1-4D3, the XR environment 400 includes a second content pane 460B.

The second content pane 460B includes, at the top of the second content pane 460B, a third icon and a third title (labeled "TITLE3"). The second content pane 460B further includes the third content including a third image and third text. The third text includes the link to the fourth content (labeled "LINK4").

During the fifth time period, the second content pane 460B and the first content pane 460A form a first stack in a collapsed configuration. In the collapsed configuration, the content panes of the stack are displaced from each other in the depth direction an amount such that portions of the content panes are visible, but the title and content of only the frontmost content pane is visible. In various implementations, the content panes are aligned (e.g., not offset) in the horizontal direction and the vertical direction. Although, the second content pane 460B and the first content pane 460A are not offset in the horizontal direction or the vertical direction of the XR environment 400, they are offset in the horizontal direction and the vertical direction on the page of FIG. 4E, due to parallax and three-dimensional perspective.

Accordingly, in various implementations, a webpage is displayed in a new content pane of an existing stack in response to detecting a hand gesture (e.g., a pinch-and-release gesture) from a user while a gaze location of the user is at a location associated with a link to the webpage. In various implementations, the hand gesture is performed at a location at which the link to the webpage is displayed while a gaze location of the user is at the location at which the link to the webpage is displayed (as illustrated in FIG. 4D1) or at least within a threshold distance of that location (as illustrated in FIG. 4D3). In various implementations, the hand gesture is performed at a location at least a threshold distance from the location at which the link to the webpage is displayed (and, in various implementations, at least a threshold distance from any user interface element) while the gaze location of the user is at the location at which the link to the webpage is displayed (as illustrated in FIG. 4D2).

During the fifth time period, the gaze location indicator 451 indicates that the gaze location of the user is at a location of the third image. During the fifth time period, the right hand 452 is in a neutral position.

FIG. 4F1 illustrates the XR environment 400 during a sixth time period subsequent to the fifth time period. During the sixth time period, the gaze location indicator 451 indicates that the gaze location of the user is at a location of the link to the fourth content. During the sixth time period, the right hand 452 performs a pinch gesture at the location of the link to the fourth content (as illustrated in FIG. 4F1), moves to the left, and performs a release gesture at an open location.

FIG. 4F2 illustrates an alternative implementation of the XR environment 400 during the sixth time period. During the sixth time period, the gaze location indicator 451 indicates that the gaze location of the user is at the location of the link to the fourth content. During the sixth time period, the right hand 452 performs a pinch gesture at a location at least a threshold distance from the link to the fourth content (as illustrated in FIG. 4F2), moves to the left, and performs a release gesture a relative position away from the location of the pinch gesture, wherein a location the relative position away from the location of the link to the fourth content is the open location. In various implementations, the location at least a threshold distance from the location of the link to the fourth content is at least a threshold distance from any user interface element. In various implementations, the location is at least a threshold distance from the gaze location of the user.

FIG. 4F3 illustrates an alternative implementation of the XR environment 400 during the sixth time period. During the sixth time period, the gaze location indicator 451 indicates that the gaze location of the user is within a threshold distance from the location of the link to the fourth content. During the sixth time period, the right hand 452 performs a pinch gesture at the location of the link to the fourth content (as illustrated in FIG. 4F3), moves to the left, and performs a release gesture at an open location.

Figure 4G:
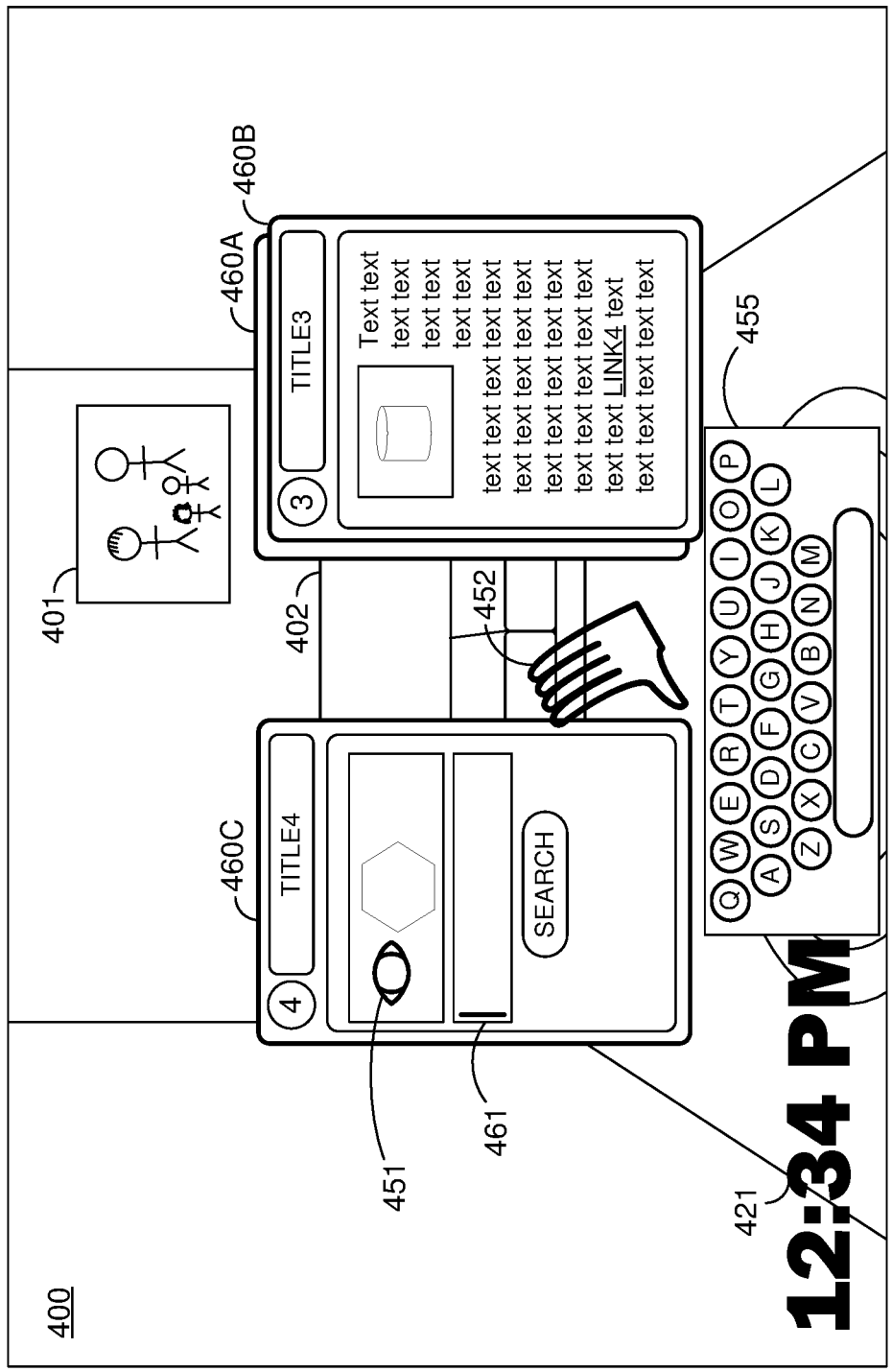

FIG. 4G illustrates the XR environment 400 during a seventh time period subsequent to the sixth time period. During the seventh time period, in response to detecting the user input of any of FIGS. 4F1-4F3, the XR environment 400 includes a third content pane 460C at the open location. The third content pane 460C includes, at the top of the third content pane 460C, a fourth icon and a fourth title (labeled "TITLE4"). The third content pane 460C further includes the fourth content including a fourth image, a search bar 461, and a search button.

Accordingly, in various implementations, a webpage is displayed in a new content pane of a new stack in response to detecting a hand gesture (e.g., a pinch-and-release gesture) from a user while a gaze location of the user is at a location associated with a link to the webpage. In various implementations, the hand gesture is performed at a location at which the link to the webpage is displayed while a gaze location of the user is at the location at which the link to the webpage is displayed (as illustrated in FIG. 4F1) or at least within a threshold distance of that location (as illustrated in FIG. 4F3). In various implementations, the hand gesture is performed at a location at least a threshold distance from the location at which the link to the webpage is displayed (and, in various implementations, at least a threshold distance from any user interface element) while the gaze location of the user is at the location at which the link to the webpage is displayed (as illustrated in FIG. 4F2).

During the seventh time period, the search bar 461 is selected, as indicated by the cursor displayed in the search bar 461. The search bar 461 is a text input field. Accordingly, as a text input field is selected, a virtual keyboard 455 is displayed in the XR environment 400. The virtual keyboard 455 includes a plurality of user interface elements (e.g., keys) for inserting characters into the text input field.

During the seventh time period, the gaze location indicator 451 indicates that the gaze location of the user is a location of the fourth image. During the seventh time period, the right hand 452 is in a neutral position.

FIG. 4H1 illustrates the XR environment 400 during an eighth time period subsequent to the seventh time period. During the eighth time period, the gaze location indicator 451 indicates that a gaze of the user is at a location of the A-key of the virtual keyboard 455. During the eighth time period, the right hand 452 performs a pinch gesture at the location of the A-key (as illustrated in FIG. 4H1) and performs a release gesture within a threshold amount of time of the pinch gesture.

FIG. 4H2 illustrates an alternative implementation of the XR environment 400 during the eighth time period. During the eighth time period, the gaze location indicator 451 indicates that a gaze of the user is at a location of the A-key of the virtual keyboard 455. During the eighth time period, the right hand 452 performs a pinch gesture at least a threshold distance away from the location of the A-key (as illustrated in FIG. 4H2) and performs a release gesture within a threshold amount of time of the pinch gesture. In various implementations, the location at least a threshold distance from the location of the A-key is at least a threshold distance from any user interface element. In various implementations, the location is at least a threshold distance from the gaze location of the user.

FIG. 4H3 illustrates an alternative implementation of the XR environment 400 during the eighth time period. During the eighth time period, the gaze location indicator 451 indicates that gaze location of the user is at a location of the Q-key of the virtual keyboard 455, but within a threshold distance of the location of the A-key. During the eighth time period, the right hand 452 performs a pinch gesture at the location of the A-key (as illustrated in FIG. 4H3) and performs a release gesture within a threshold amount of time of the pinch gesture.

FIG. 4H4 illustrates an alternative implementation of the XR environment 400 during the eighth time period. During the eighth time period, the gaze location indicator 451 indicates that the gaze location of the user is at a location of the search bar 461, which is at least the threshold distance away from the A-key. During the eighth time period, the right hand 452 performs a pinch gesture at the location of the A-key (as illustrated in FIG. 4H4) and performs a release gesture within a threshold amount of time of the pinch gesture. In various implementations, if the gaze location of the user was not within a threshold distance of the search bar 461 and was the threshold distance away from the pinch gesture (e.g., if the user was looking an open space or the picture 401), the presence of the A-key is ignored and no action is performed.

FIG. 4H5 illustrates an alternative implementation of the XR environment 400 during the eighth time period. During the eighth time period, the XR environment 400 includes a keyboard representation 457 proximate to the search bar 461. The keyboard representation 457 includes representations of the keys of the virtual keyboard 455 proximate to a location of the right hand 452. The keyboard representation 457 includes a hand location indicator 453 indicating the location of the right hand 452 with respect to the virtual keyboard 455. During the eighth time period, the hand location indicator 453 indicates that the right hand 452 is at a location of the A-key. During the eighth time period, the gaze location indicator 451 indicates that the gaze of the user is at a location of the representation of the A-key. During the eighth time period, the right hand 452 performs a pinch gesture at the location of the A-key (as illustrated in FIG. 4H5) and performs a release gesture within a threshold amount of time of the pinch gesture.

Figure 4I:
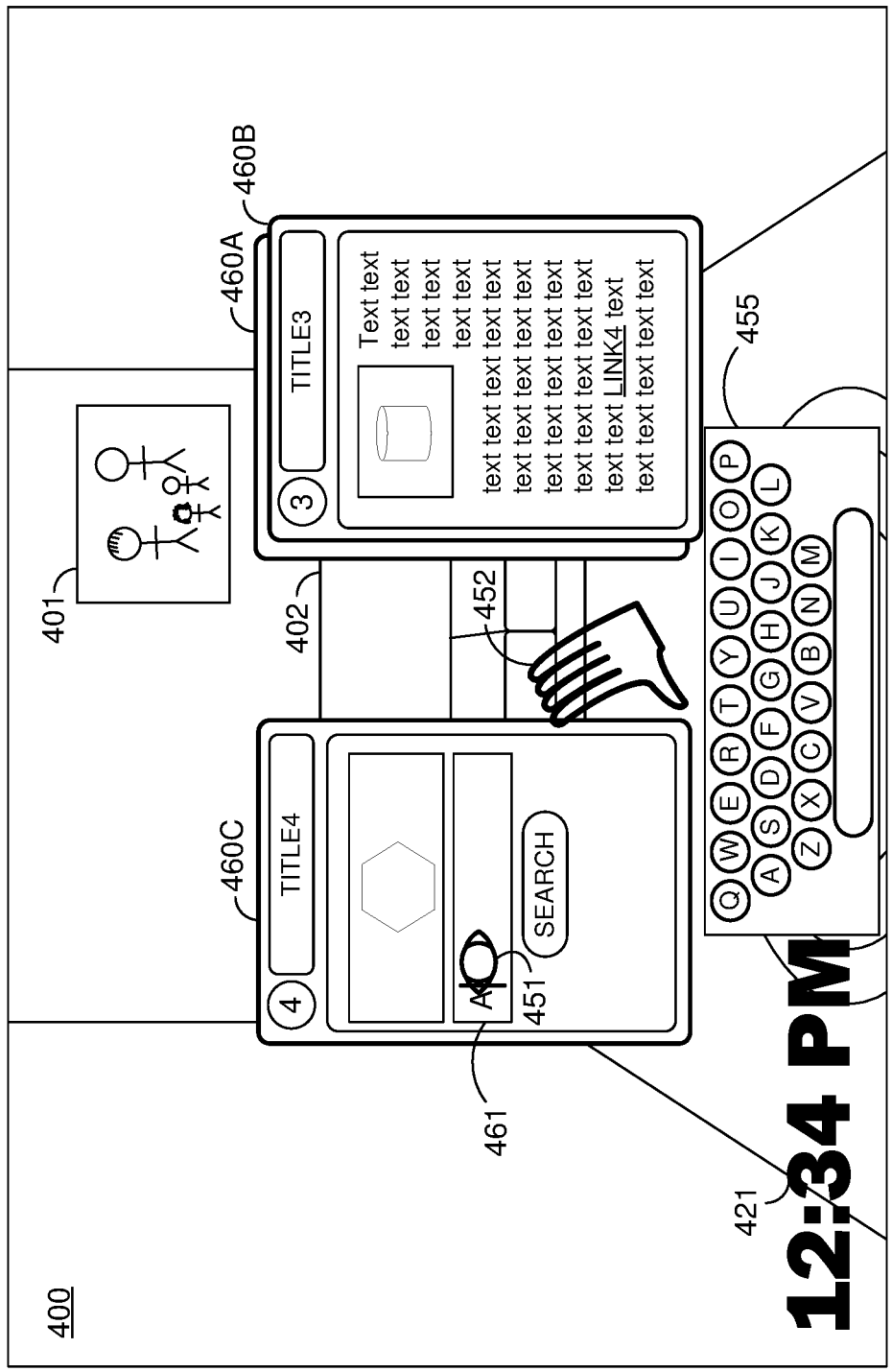

FIG. 4I illustrates the XR environment 400 during a ninth time period subsequent to the eighth time period. During the ninth time period, in response to detecting the user input of any of FIGS. 4H1-4H5, the character "A" is inserted into the search bar 461.

Accordingly, in various implementations, a user interface element is selected in response to detecting a hand gesture (e.g., a pinch-and-release gesture) from a user while a gaze location of the user is at a location associated with the user interface element. In various implementations, the hand gesture is performed at a location at which the user interface element is displayed while a gaze location of the user is at the location at which the user interface element is displayed (as illustrated in FIG. 4H1), at least within a threshold distance of that location (as illustrated in FIG. 4H3), at a location of at which a representation of the user interface element is displayed (as illustrated in FIG. 4H5), or at a location at which an associated user interface element is displayed (as illustrated in FIG. 4H4). In various implementations, the hand gesture is performed at a location at least a threshold distance from the location at which the user interface element is displayed (and, in various implementations, at least a threshold distance from any user interface element) while the gaze location of the user is at the location at which the user interface is displayed (as illustrated in FIG. 4H2).

During the ninth time period, the gaze location indicator 451 indicates that the gaze location of the user is at a location of the search bar 461. During the ninth time period, the right hand 452 is in a neutral position.

Figure 4J:
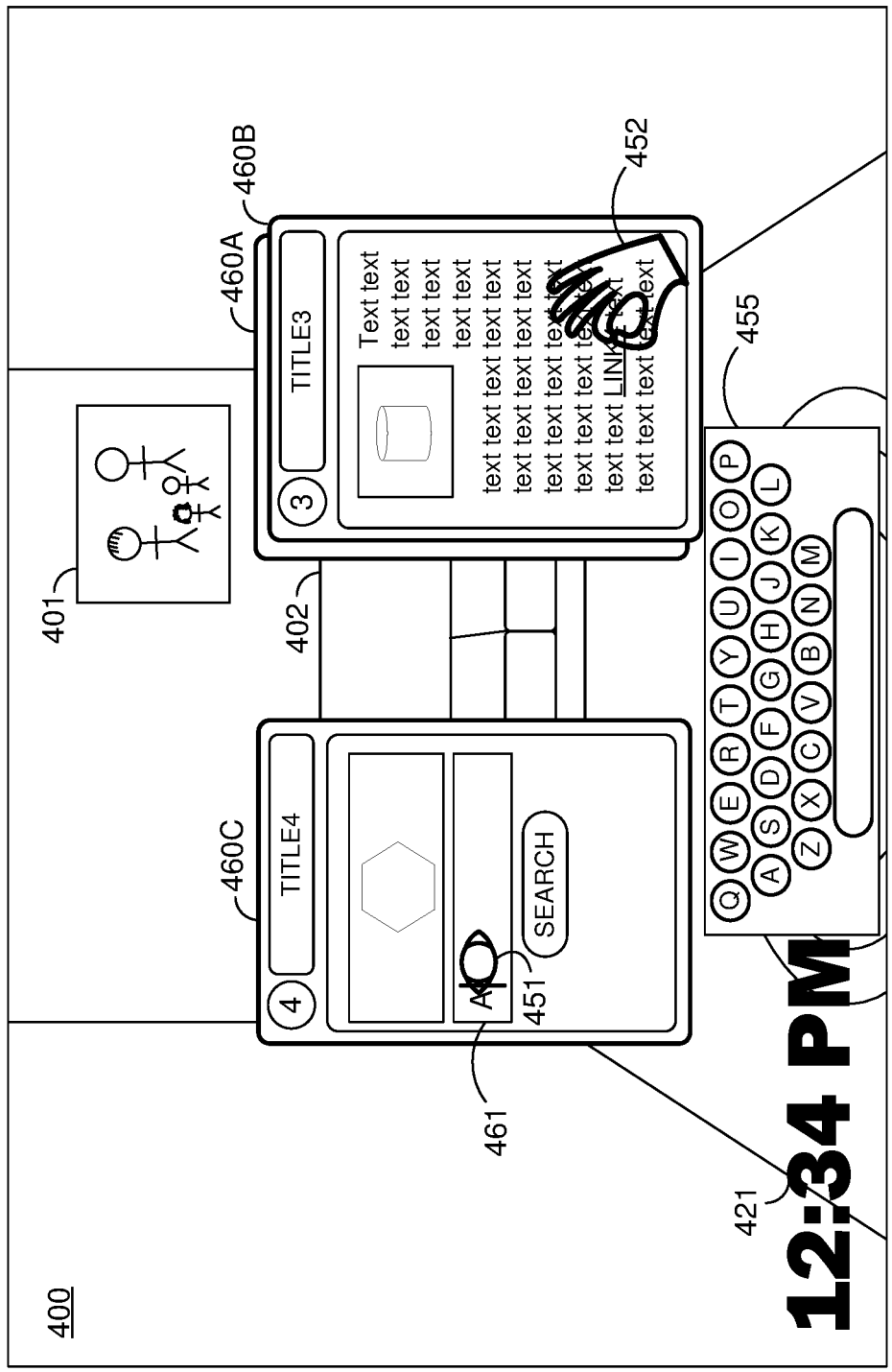

FIG. 4J illustrates the XR environment 400 during a tenth time period subsequent to the ninth time period. During the tenth time period, the gaze location indicator 451 indicates that the gaze location of the user is at a location of the search bar. During the tenth time period, the right hand 452 performs a pinch gesture at the location of the link to the fifth content at least a threshold distance away from the search bar 461 (as illustrated in FIG. 4J) and a release gesture.

Figure 4K:
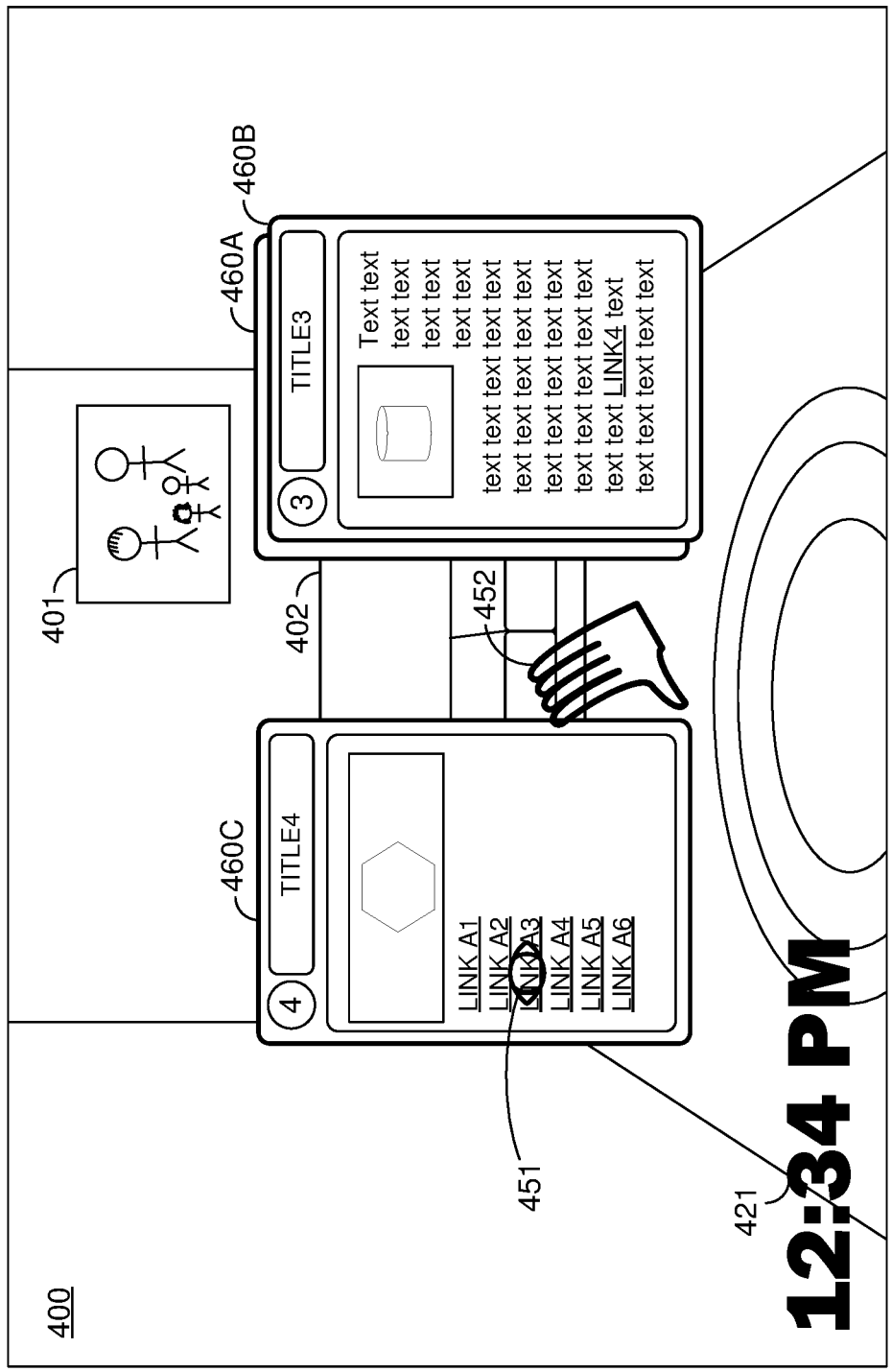

FIG. 4K illustrates the XR environment 400 during an eleventh time period subsequent to the tenth time period. During the eleventh time period, in response to detecting the user input of FIG. 4J, the third content pane 460C displays links to search results based on the characters input into the search bar 461. Thus, although the hand gesture was performed at a location of the link to the fourth content, because the gaze location of the user was at the location of the search bar, the hand gesture was interpreted as an activation of the search bar 461 (e.g., equivalent to pressing the "ENTER" key on a keyboard or selecting the search button) rather than a selection of the link to the fourth content.

In various implementations, if the same hand gesture was detected while the gaze location of the user was at a location of the link to the fourth content (or within a threshold distance of that location), the second content pane 460C would be updated to display the fourth content.

During the tenth time period, the gaze location indicator 451 indicates that the gaze location of the user is at a location of the search results. During the tenth time period, the right hand 452 is in a neutral position.

FIG. 5 is a flowchart representation of a method 500 of changing a display based on gaze information and user input in accordance with some implementations. In various implementations, the method 500 is performed by a device including an input device, an eye tracker, a display, one or more processors, and non-transitory memory (e.g., the electronic device 120 of FIG. 3). In some implementations, the method 500 is performed by processing logic, including hardware, firmware, software, or a combination thereof. In some implementations, the method 500 is performed by a processor executing instructions (e.g., code) stored in a non-transitory computer-readable medium (e.g., a memory).

The method 500 begins, in block 510, with the device displaying, on the display, a user interface element. In various implementations, the user interface element is a link to content. In various implementations, the content includes a webpage and the link to the content includes a link to a webpage, e.g., a hyperlink. For example, in FIG. 4A, the electronic device displays the link to the second content (labeled "LINK2"). In various implementations, the user interface element is a key of a virtual keyboard. For example, in FIG. 4G, the electronic device displays the virtual keyboard 455 including a plurality of keys.

The method 500 continues, in block 520, with the device receiving, via the input device, a user input from a user. In various implementations, the user input includes a hand gesture. Thus, in various implementations, the input device includes an extremity tracker and/or a hand gesture detector. In various implementations, the hand gesture is at least partially at a location at which the user interface element is displayed. For example, in FIG. 4B1, the electronic device detects the pinch gesture at the location of the link to the second content. As another example, in FIG. 4H1, the electronic device detects the pinch gesture at the location of the A-key of the virtual keyboard 455. In various implementations, the hand gesture is at least a threshold distance from a location at which the user interface element is displayed. For example, in FIG. 4B2, the electronic device detects the pinch gesture at a location at least a threshold distance away from the link to the second content. As another example, in FIG. 4H2, the electronic device detects the pinch gesture at a location at least a threshold distance away from the A-key of the virtual keyboard 455. In various implementations, the hand gesture is at least a threshold distance from a gaze location of the user.

The method 500 continues, in block 530, with the device determining, using the eye tracker, whether a gaze location of the user is at a location associated with the user interface element. In various implementations, the location associated with the user interface element is a location at which the user interface element is displayed. For example, in FIG. 4B2, the electronic device detects the gaze location of the user the location at which the link to the second content is displayed. As another example, in FIG. 4H2, the electronic device detects the gaze location of the user at the location at which the A-key is displayed. In various implementations, the location associated with the user interface element is a location within a threshold distance of a location at which the user interface element is displayed. For example, in FIG. 4B3, the electronic device detects the gaze location of the user within a threshold distance of the location at which the link to the second content is displayed. As another example, in FIG. 4H3, the electronic device detects the gaze location of the user within a threshold distance of the location at which the A-key is displayed.

In various implementations, the location associated with the user interface element is a location at which a representation of the user interface element is displayed. For example, in FIG. 4H5, the electronic device detects the gaze location of the user at a location at which a representation of the A-key is displayed within the keyboard window 457. In various implementations, the location associated with the user interface element is a location at which an associated user interface element is displayed. For example, in FIG. 4H4, the electronic device detects the gaze location of the user at the location of the search bar 461 which is associated with the virtual keyboard 455 and the plurality of keys thereof because selection of the keys inserts characters into the search bar 461.

In various implementations, determining whether the gaze location of the user is at a location associated with the user interface element includes determining that the gaze location of the user is at the location associated with the user interface element for at least a threshold amount of time.

The method 500 continues, in block 540, with the device, in response to determining that the gaze location of the user is at a location associated with the user interface element, changing, based on the user input, the display in a first manner. For example, in FIG. 4C, in response to determining that the gaze of the user is at a location associated with the link to the second content, the pinch gesture and release gesture cause the electronic device to update the first content pane 460A to include the second content.

Thus, in various implementations, the user interface element includes a link to content and changing the display in the first manner includes displaying the content. In various implementations, displaying the content includes updating a content pane to include the content (e.g., as in FIG. 4C) or displaying a new content pane including the content (e.g., as in FIG. 4E and FIG. 4G) based on the user input, e.g., the hand gesture.

For example, in various implementations, displaying the content includes updating a content pane to include the content, wherein the user input includes a pinch gesture and a release gesture within a threshold amount of time after the pinch gesture, e.g., a quick-pinch. As another example, in various implementations, displaying the content includes displaying a new content pane including the content, wherein the user input includes a pinch gesture and a release gesture after a threshold amount of time from the pinch gesture, e.g. a long-pinch. As another example, in various implementations, displaying the content includes displaying a new content pane including the content, wherein the user input includes a pinch gesture and a release gesture in front of the pinch gesture, e.g. a pinch-and-pull.

The method 500 continues, in block 550, with the device, in response to determining that the gaze location of the user is not at a location associated with the user interface element, changing, based on the user input, the display in a second manner different than the first manner. For example, in FIG. 4K, in response to determining that the gaze location of the user is not at a location associated with the link to the fourth content, the pinch gesture and release gesture at the location of the link to the fourth contents cause the electronic device to activate the search bar 461. Thus, in various implementations, changing the display in the second manner does not include displaying the content. In various implementations, changing the display in the second manner includes activating a second user interface element, such as the search bar 461 in FIG. 4K. In various implementations, changing the display in the second manner includes, depending on the hand gesture, displaying second content different than the content (e.g., if a different link is activated), displaying a menu (e.g., a dock of application icons), or ceasing to display the link to the content (e.g., by closing a content pane including the link to the content).

Thus, in various implementations, a function is performed upon a user interface element (e.g., selection, activation, etc., based on the user input) is selected or activated when the user input is detected while a gaze location of the user is at a location associated with the user interface element. However, even if the user input is directed to the user interface element, the function is not performed if the gaze location of the user is not at a location associated with the user interface element.

For example, in FIG. 4B2, the hand gesture is detected at least a threshold distance away from the link to the second content, but the gaze location of the user is at the location of the second content. Accordingly, the link to the second content is selected. As another example, in FIG. 4B3, the hand gesture is detected at the location of the link to the second content and the gaze location of the user is within a threshold distance of the link to the second content. Accordingly, the link to the second content is selected. In contrast, in FIG. 4B3, although the gaze direction of the user is at a location associated with the link to the third content, the hand gesture is detected at a location that is not at least a threshold distance from the link to the third content. Thus, the link to the third content is not selected. Similarly, in FIG. 4H3, the hand gesture is detected at the location of the A-key and the gaze location of the user is within a threshold distance of the A-key. Accordingly, the A-key is selected. In contrast, in FIG. 4H3, although the gaze direction of the user is at a location associated with the Q-key, the hand gesture is detected at a location that is not at least a threshold distance from the Q-key. Thus, the Q-key is not selected.

Because a user may be familiar with the layout of a virtual keyboard and may need not look at the virtual keyboard to input text, the keys are selected in response to determining that the gaze location of the user is at a location associated with the keys, such as a text input field (e.g., the search bar 461 of FIG. 4H4) or representations of the keys (e.g., the keyboard window 457 of FIG. 4H5). In various implementations, certain user interface elements (e.g., familiar user interface elements such as the keys of a virtual keyboard) are selected in response to detecting a hand gesture at the location at which the user interface element is displayed independent of gaze, whereas other user interface elements (e.g., links to content) are selected based on hand gesture dependent on gaze (e.g., that the gaze location is at a location associated with the user interface element).

Figure 6:
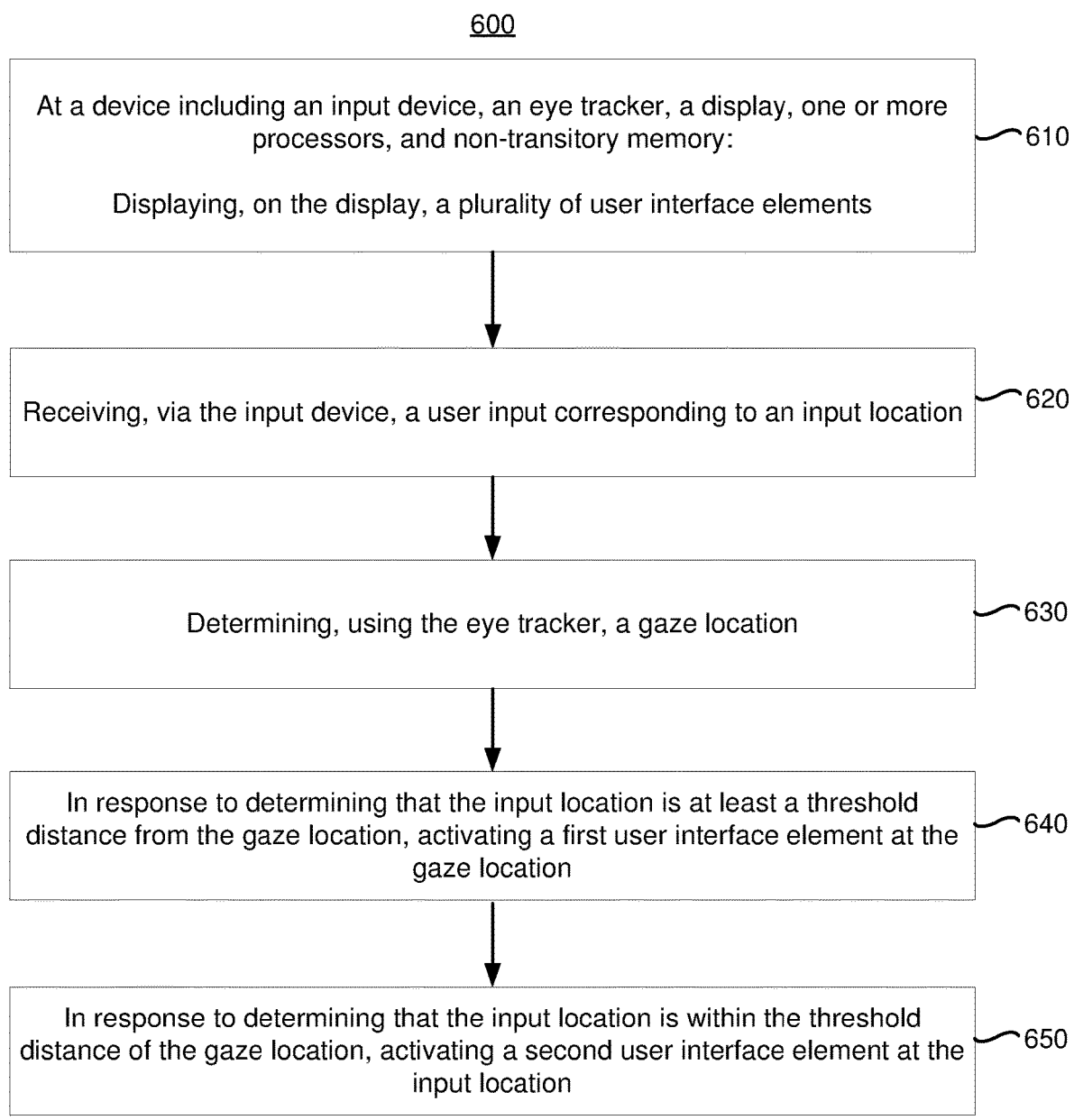
FIG. 6 is a flowchart representation of a method of activating a user interface element in accordance with some implementations.

FIG. 6 is a flowchart representation of a method 600 of activating a user interface element in accordance with some implementations. In various implementations, the method 600 is performed by a device including an input device, an eye tracker, a display, one or more processors, and non-transitory memory (e.g., the electronic device 120 of FIG. 3). In some implementations, the method 600 is performed by processing logic, including hardware, firmware, software, or a combination thereof. In some implementations, the method 500 is performed by a processor executing instructions (e.g., code) stored in a non-transitory computer-readable medium (e.g., a memory).

The method 600 begins, in block 610, with the device displaying, on the display, a plurality of user interface elements. In various implementations, the plurality of user interface elements includes a link to content. In various implementations, the content includes a webpage and the link to the content includes a link to a webpage, e.g., a hyperlink. For example, in FIG. 4A, the electronic device displays the link to the second content (labeled "LINK2"). In various implementations, the plurality of user interface elements includes one or more keys of a virtual keyboard. For example, in FIG. 4G, the electronic device displays the virtual keyboard 455 including a plurality of keys.

The method 600 continues, in block 620, with the device receiving, via the input device, a user input corresponding to an input location. In various implementations, the user input includes a hand gesture. Thus, in various implementations, the input device includes an extremity tracker and/or a hand gesture detector. In various implementations, the input location is the location of a hand gesture. For example, in FIG. 4B1, the electronic device detects the pinch gesture at the location of the link to the second content and the input location is the location of the link to the second content. As another example, in FIG. 4H1, the electronic device detects the pinch gesture at the location of the A-key of the virtual keyboard 455 and the input location is the location of the A-key of the virtual keyboard 455. In various implementations, the input location is the location of an input location indicator. For example, in FIG. 4H5, the electronic device detects the pinch gesture at the location of the A-key of the virtual keyboard 455 while displaying the keyboard representation 457 including the hand location indicator 453 and the input location is the location of the hand location indicator (at the location of the representation of the A-key).

Thus, in various implementations, the input location is a two-dimensional or three-dimensional location at which the user input occurs, such as the location of touch input or a hand gesture. In various implementations, the input location is a location identified or indicated by the user input, such as a location a user is pointing at (using a hand or pointing input device) or the location of a cursor moved by a user using an input device.

The method 600 continues, in block 630, with the device determining, using the eye tracker, a gaze location.

The method 600 continues, in block 640, with the device, in response to determining that the input location is at least a threshold distance from the gaze location, activating a first user interface element at the gaze location. For example, in FIG. 4B2, in which the gaze location is at the location of the link to the second content, the electronic device detects the pinch gesture at a location at least a threshold distance away from the gaze location and activates the link to the second content. As another example, in FIG. 4H2, in which the gaze location is at the location of the A-key of the virtual keyboard 455, the electronic device detects the pinch gesture at a location at least a threshold distance away from the gaze location and activates the A-key of the virtual keyboard 455.

The method 600 continues, in block 650, with the device, in response to determining that the input location is within the threshold distance of the gaze location, activating a second user interface element at the input location. For example, in FIG. 4B1, in which the gaze location is at the location of the link to the second content, the electronic device detects the pinch gesture (also at the location of the link to the second content) within the threshold distance of the gaze location and activates the link to the second content. As another example, in FIG. 4B3, in which the gaze location is at the location of the link to the third content, the electronic device detects the pinch gesture (at the location of the link to the second content) within the threshold distance of the gaze location and activates the link to the second content. As another example, in FIG. 4H3, in which the gaze location is at the location of the Q-key of the virtual keyboard 455, the electronic device detects the pinch gesture (at the location of the A-key of the virtual keyboard 455) within the threshold distance of the gaze location and activates the A-key of the virtual keyboard).

In various implementations, activating the first user interface element at the gaze location (in block 640) excludes activating the second user interface element at the input location. For example, in FIG. 4J, in which the gaze location is at the location of the search bar 461, the electronic device detects the pinch gesture (at the location of the link to the fourth content) at least the threshold distance from the gaze location and activate the search bar 461 without activating the link to the fourth content.

In various implementations, activating the second user interface element at the input location (in block 650) excludes activating the first user interface element at the gaze location. For example, in FIG. 4B3, in which the gaze location is at the location of the link to the third content, the electronic device detects the pinch gesture (at the location of the link to the second content) within the threshold distance of the gaze location at activates the link to the second content without activating the link to the third content.

In various implementations, the first user interface element is a representation of the second user interface element. For example, in FIG. 4H5, the representation of the A-key in the keyboard representation 457 is a representation of the A-key of the virtual keyboard 455. In various implementations, the threshold distance is based on at least one of the first type of the first user interface element and a second type of the second user interface element. For example, in FIG. 4H4, the threshold distance is large because the A-key of the virtual keyboard 455 is a keyboard key rather than a link to content.

In various implementations, the first user interface element includes a link to content and activating the first user interface element includes displaying the content. In various implementations, displaying the content includes updating a content pane to include the content (e.g., as in FIG. 4C) or displaying a new content pane including the content (e.g., as in FIG. 4E and FIG. 4G) based on the user input, e.g., the hand gesture.

For example, in various implementations, displaying the content includes updating a content pane to include the content, wherein the user input includes a pinch gesture and a release gesture within a threshold amount of time after the pinch gesture, e.g., a quick-pinch. As another example, in various implementations, displaying the content includes displaying a new content pane including the content, wherein the user input includes a pinch gesture and a release gesture after a threshold amount of time from the pinch gesture, e.g. a long-pinch. As another example, in various implementations, displaying the content includes displaying a new content pane including the content, wherein the user input includes a pinch gesture and a release gesture in front of the pinch gesture, e.g. a pinch-and-pull, or a pinch gesture and a release gesture at an open location, e.g., a pinch-and-drag.

While various aspects of implementations within the scope of the appended claims are described above, it should be apparent that the various features of implementations described above may be embodied in a wide variety of forms and that any specific structure and/or function described above is merely illustrative. Based on the present disclosure one skilled in the art should appreciate that an aspect described herein may be implemented independently of any other aspects and that two or more of these aspects may be combined in various ways. For example, an apparatus may be implemented and/or a method may be practiced using any number of the aspects set forth herein. In addition, such an apparatus may be implemented and/or such a method may be practiced using other structure and/or functionality in addition to or other than one or more of the aspects set forth herein.

It will also be understood that, although the terms "first," "second," etc. may be used herein to describe various elements, these elements should not be limited by these terms. These terms are only used to distinguish one element from another. For example, a first node could be termed a second node, and, similarly, a second node could be termed a first node, which changing the meaning of the description, so long as all occurrences of the "first node" are renamed consistently and all occurrences of the "second node" are renamed consistently. The first node and the second node are both nodes, but they are not the same node.

The terminology used herein is for the purpose of describing particular implementations only and is not intended to be limiting of the claims. As used in the description of the implementations and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

What is claimed is:

1. A method comprising:
   at an electronic device with an input device, an eye tracker, a display, one or more processors, and a non-transitory memory:
   displaying, on the display, a plurality of user interface elements;
   receiving, via the input device, a user input corresponding to an input location;
   determining, using the eye tracker, a gaze location;
   determining whether a distance between the input location and the gaze location is at least a threshold distance;
   in response to receiving the user input, determining whether to activate a first user interface element at the gaze location or a second user interface element at the input location, wherein:
      the first user interface element is configured to be activated when the input location is at least a threshold distance from the gaze location; and
      the second user interface element is configured to be activated when the input location is within the threshold distance of the gaze location; and
   activating the first user interface element or the second user interface element.

2. The method of claim 1, wherein activating the first user interface element at the gaze location excludes activating the second user interface element at the input location.

3. The method of claim 1, wherein activating the second user interface element at the input location excludes activating the first user interface element at the gaze location.

4. The method of claim 1, wherein the input location is the location of a hand gesture.

5. The method of claim 1, wherein the input location is the location of an input location indicator.

6. The method of claim 1, wherein the first user interface element is a representation of the second user interface element.

7. The method of claim 1, wherein the threshold distance is based on at least one of a first type of the first user interface element and a second type of the second user interface element.

8. The method of claim 1, wherein the first user interface element includes a link to content and activating the first user interface element includes displaying the content.

9. The method of claim 8, wherein displaying the content includes updating a content pane to include the content.

10. The method of claim 9, wherein the user input includes a pinch gesture and a release gesture within a threshold amount of time after the pinch gesture.

11. The method of claim 8, wherein displaying the content includes displaying a new content pane including the content.

12. The method of claim 11, wherein the user input includes a pinch gesture and a release gesture after a threshold amount of time from the pinch gesture.

13. The method of claim 11, wherein the user input includes a pinch gesture and a release gesture in front of the pinch gesture.

14. The method of claim 11, wherein the user input includes a pinch gesture and a release gesture at an open location.

15. A device comprising:
an input device;
an eye tracker;
a display,
a non-transitory memory; and
one or more processors to:
  display, on the display, a plurality of user interface elements;
  receive, via the input device, a user input corresponding to an input location;
  determine, using the eye tracker, a gaze location;
  determine whether a distance between the input location and the gaze location is at least a threshold distance;
  in response to receiving the user input, determine whether to activate a first user interface element at the gaze location or a second user interface element at the input location, wherein:
    the first user interface element is configured to be activated when the input location is at least a threshold distance from the gaze location, activate a first user interface element at the gaze location; and
    the second user interface element is configured to be activated when the input location is within the threshold distance of the gaze location, activate a second user interface element at the input location; and
  activating the first user interface element or the second user interface element.

16. The device of claim 15, wherein the input location is the location of a hand gesture.

17. The device of claim 15, wherein the first user interface element includes a link to content and activating the first user interface element includes displaying the content.

18. The device of claim 15, wherein the user input includes a pinch gesture and a release gesture after a threshold amount of time from the pinch gesture.

19. The device of claim 15, wherein the user input includes a pinch gesture and a release gesture at an open location.

20. A non-transitory memory storing one or more programs, which, when executed by one or more processors of a device including an input device, an eye tracker, and a display, cause the device to:
  display, on the display, a plurality of user interface elements;
  receive, via the input device, a user input corresponding to an input location;
  determine, using the eye tracker, a gaze location;
  determine whether a distance between the input location and the gaze location is at least a threshold distance;
  in response to receiving the user input, determine whether to activate a first user interface element at the gaze location or a second user interface element at the input location, wherein:
    the first user interface element is configured to be activated when the input location is at least a threshold distance from the gaze location, activate a first user interface element at the gaze location; and
    the second user interface element is configured to be activated when the input location is within the threshold distance of the gaze location, activate a second user interface element at the input location; and
  activating the first user interface element or the second user interface element.

* * * * *